US012668499B2

(12) United States Patent
Pedroso et al.

(10) Patent No.: US 12,668,499 B2
(45) Date of Patent: Jun. 30, 2026

(54) PROCESS FOR PRODUCING NANO PRECIPITATED CALCIUM CARBONATE

(71) Applicant: OMYA INTERNATIONAL AG, Oftringen (CH)

(72) Inventors: Luis Pedroso, Antanhol (PT); Holger Spiegel, Villach (AT); Mathieu Skrzypczak, Birmingham, AL (US)

(73) Assignee: OMYA INTERNATIONAL AG, Oftringen (CH)

( * ) Notice: Subject to any disclaimer, the term of this patent is extended or adjusted under 35 U.S.C. 154(b) by 1316 days.

(21) Appl. No.: 17/428,577

(22) PCT Filed: Feb. 14, 2020

(86) PCT No.: PCT/EP2020/053983
§ 371 (c)(1),
(2) Date: Aug. 4, 2021

(87) PCT Pub. No.: WO2020/165445
PCT Pub. Date: Aug. 20, 2020

(65) Prior Publication Data
US 2022/0106194 A1 Apr. 7, 2022

(30) Foreign Application Priority Data
Feb. 15, 2019 (EP) ..................................... 19157596

(51) Int. Cl.
*C01F 11/18* (2006.01)
*C09C 1/02* (2006.01)
(52) U.S. Cl.
CPC ............ *C01F 11/181* (2013.01); *C09C 1/021* (2013.01); *C01P 2004/03* (2013.01);
(Continued)

(58) Field of Classification Search
CPC ........ C01F 11/181; C01F 11/18; C09C 1/021; C09C 3/041; C09C 3/04; C01P 2004/03;
(Continued)

(56) References Cited

U.S. PATENT DOCUMENTS

| | | | |
|---|---|---|---|
| 5,811,070 A | 9/1998 | You | |
| 6,475,459 B1 | 11/2002 | Virtanen | |
| 2002/0164280 A1 * | 11/2002 | Kinnen | C01F 11/181 |
| | | | 423/432 |

FOREIGN PATENT DOCUMENTS

| | | | | |
|---|---|---|---|---|
| EP | 2371766 A1 | 10/2011 | | |
| EP | 2447213 A1 | 5/2012 | | |
| EP | 2524898 A1 | 11/2012 | | |
| EP | 3275838 A1 | 1/2018 | | |
| WO | WO-03106344 A1 * | 12/2003 | | C01F 11/18 |
| WO | 2013142473 A1 | 9/2013 | | |

OTHER PUBLICATIONS

Gilson: Laboratory Disk Mills [online], [retrieved on Feb. 8, 2025]. Retrieved from the internet: < URL: https://www.globalgilson.com/laboratory-disk-mills?srsltid= AfmBOooAe7MPMwrtM4a7gcsQNsysHsq06033qNvFuFZg_ 1ZYxrOJnetP .> (Year: 2025).*

(Continued)

*Primary Examiner* — Coris Fung
(74) *Attorney, Agent, or Firm* — Lippes Mathias LLP

(57) ABSTRACT

The present invention refers to a process for producing nano precipitated calcium carbonate (nano-PCC), as well as to the nano precipitated calcium carbonate (nano-PCC) obtained by such a process and a system for producing the nano precipitated calcium carbonate (nano-PCC) comprising at least one dry mill, preferably a dry sandmill. Furthermore, the present invention refers to the use of the nano precipitated calcium carbonate (nano-PCC) as well as to the use of the inventive system for producing nano precipitated calcium carbonate (nano-PCC).

11 Claims, 7 Drawing Sheets

SEM Photograph of trial 13

(52) U.S. Cl.
CPC ...... *C01P 2004/51* (2013.01); *C01P 2004/62*
(2013.01); *C01P 2006/12* (2013.01); *C01P*
*2006/82* (2013.01)

(58) Field of Classification Search
CPC .............. C01P 2004/51; C01P 2004/62; C01P
2006/12; C01P 2004/61; C01P 2006/82;
C01P 2004/50; B01J 10/00
USPC .......................... 423/432, 165, 430; 524/425
See application file for complete search history.

(56) References Cited

OTHER PUBLICATIONS

Hosokawa Alpine Group: Ball Mills and Agitated Media Mills [online], [retrieved on Feb. 8, 2025]. Retrieved from the internet: < URL: https://www.hosokawa-alpine.com/powder-particle-processing/machines/ball-mills-agitated-media-mills/.> (Year: 2025).*

Meadows: Hammer Mills [online], [retrieved on Feb. 8, 2025]. Retrieved from the internet: < URL: https://www.meadowsmills.com/HammerMILLS .> (Year: 2025).*

Bythrow, Identifying a Pin Mill for Optimal Performance and Minimal Downtime [online], [retrieved on Feb. 8, 2025]. Retrieved from the internet: < URL: https://www.powderbulksolids.com/size-reduction/identifying-a-pin-mill-for-optimal-performance-and-minimal-downtime.> (Year: 2025).*

JetmillMFG: Jet Mill [online], [retrieved on Feb. 8, 2025]. Retrieved from the internet: < URL: https://www.jetmillmfg.com/jet-mill/ .> (Year: 2025).*

Hariharan et al., Synthesis and Characterisation of CaCO3 (Calcite) Nano Particles from Cockle Shells Using Chitosan as Precursor, International Journal of Scientific and Research Publications, vol. 4, Issue 10, Oct. 2014; ISSN 2250-3153 https://www.ijsrp.org/research-paper-1014/ijsrp-p3442.pdf (Year: 2014).*

International Search Report for PCT Application No. PC/EP2020/053983, Mailed Apr. 28, 2020, 11 pages.

* cited by examiner

Figure 1:
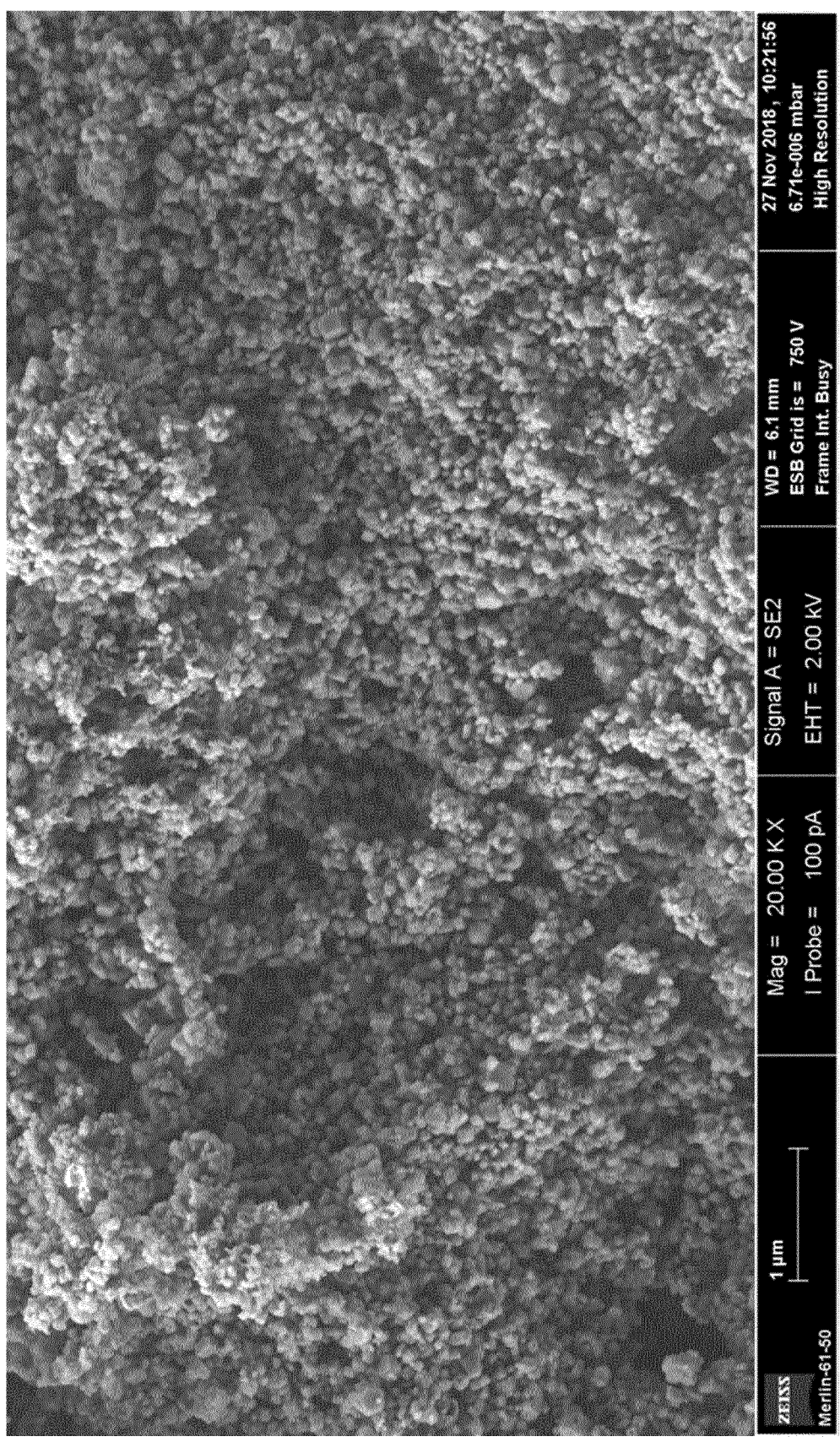

Figure 1: SEM Photograph of trial 13

Figure 2:
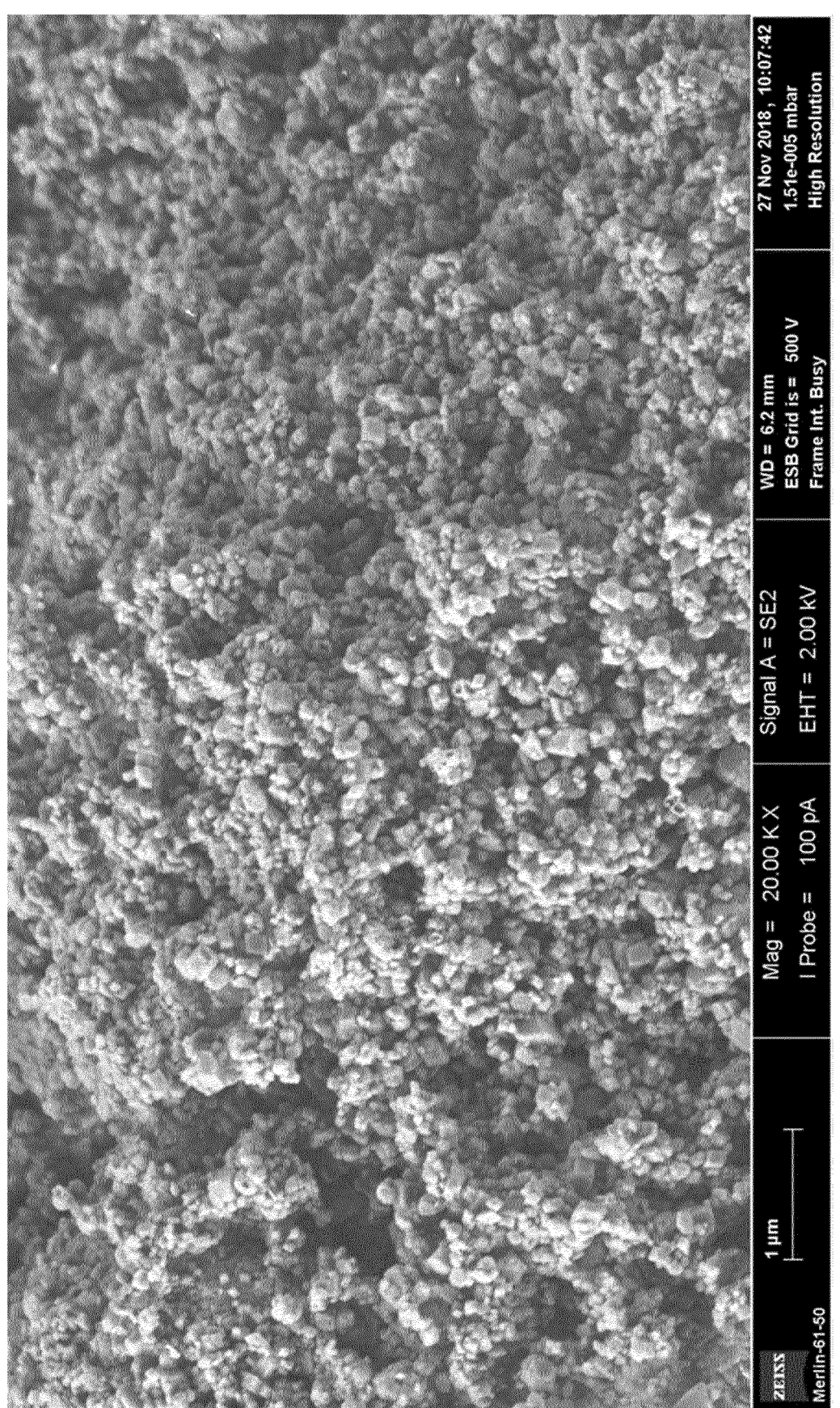

Figure 2: SEM Photograph of trial 15

Figure 3:
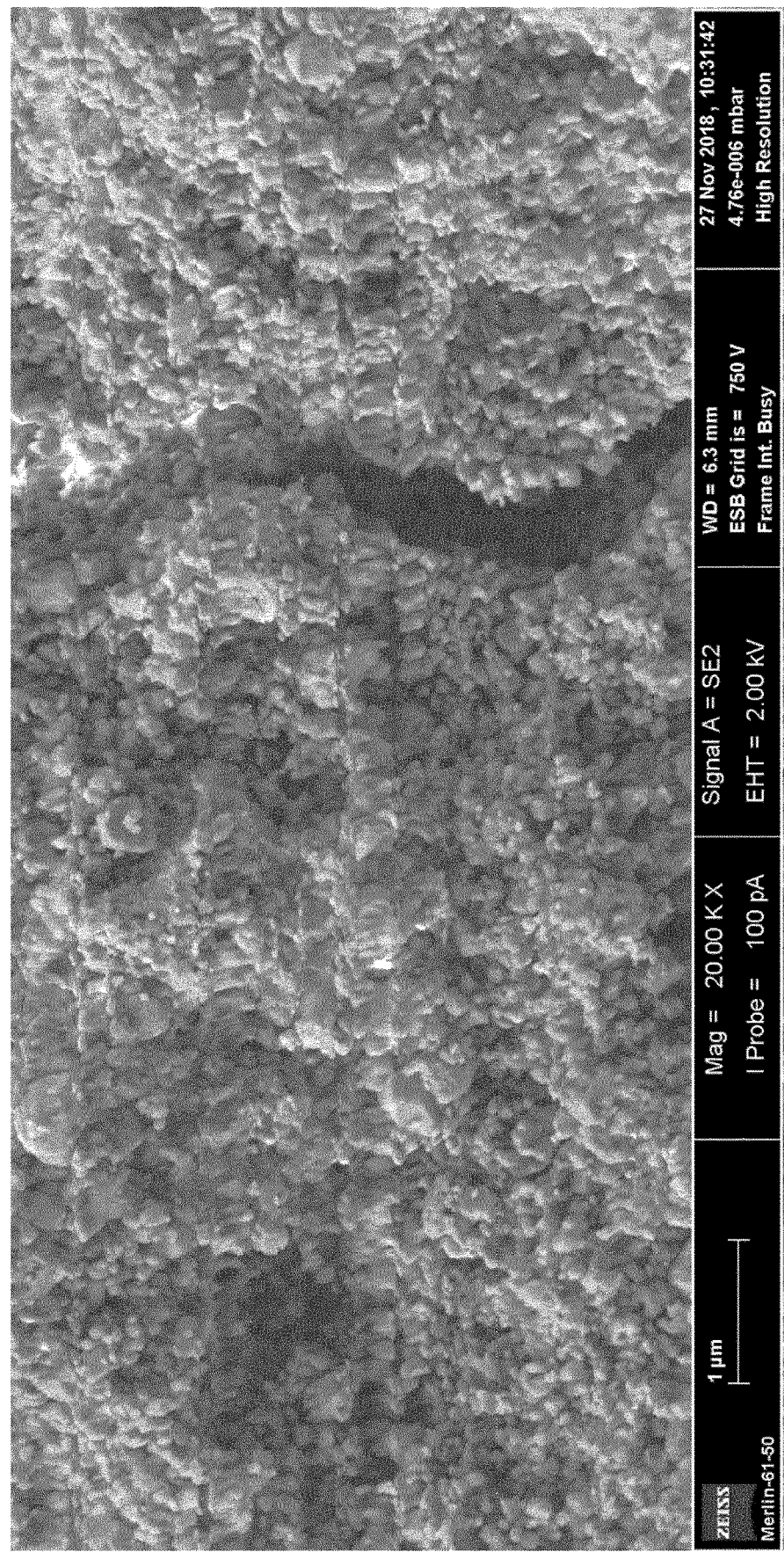

Figure 3: SEM Photograph of trial 19

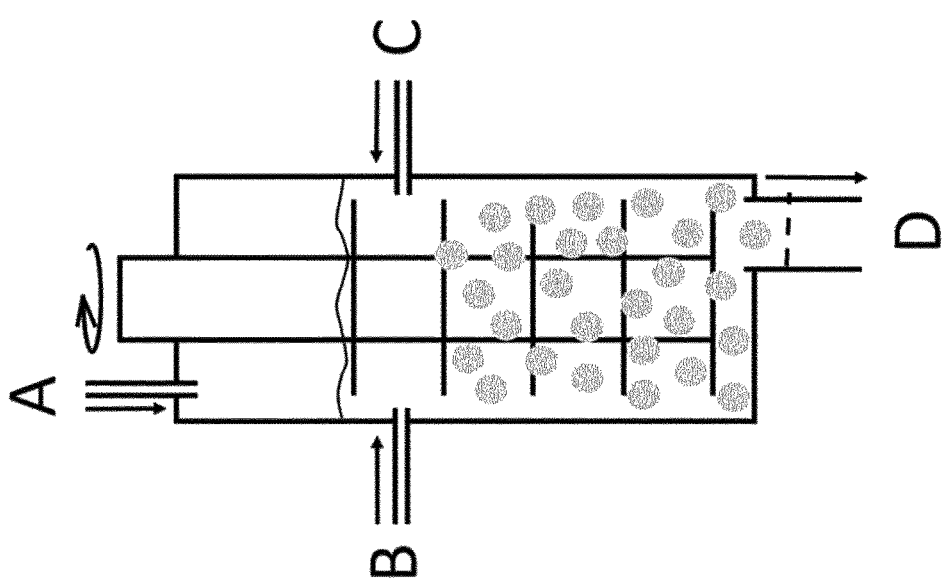
Figure 6: Schematic figure of a the inventive system comprising a dry sandmill and inlets A), B) C) and outlet D) wherein milling beads are present in the dry sandmill as well as educts up to the liquid inlet level
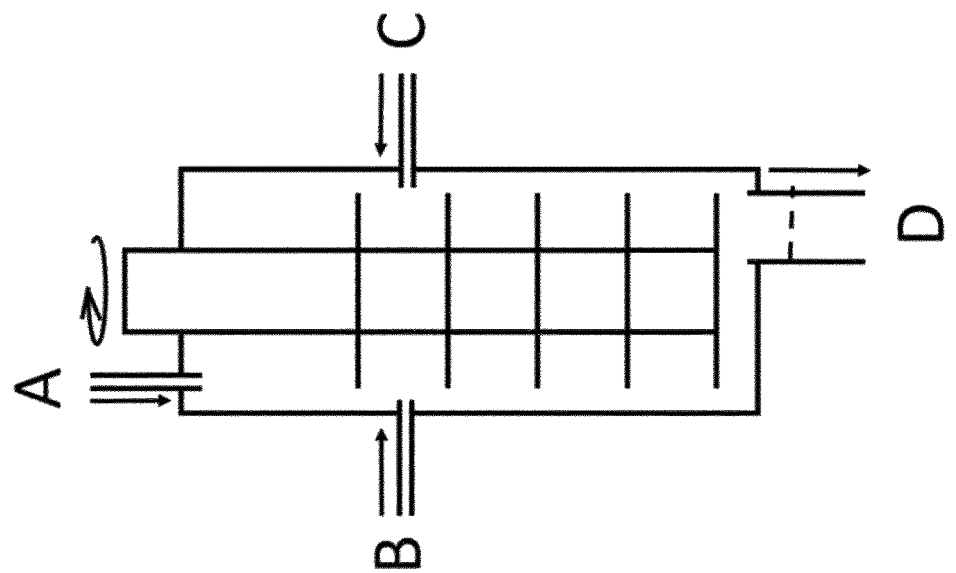
Figure 5: Schematic figure of a the inventive system comprising a dry sandmill and inlets A), B) C) and outlet D)

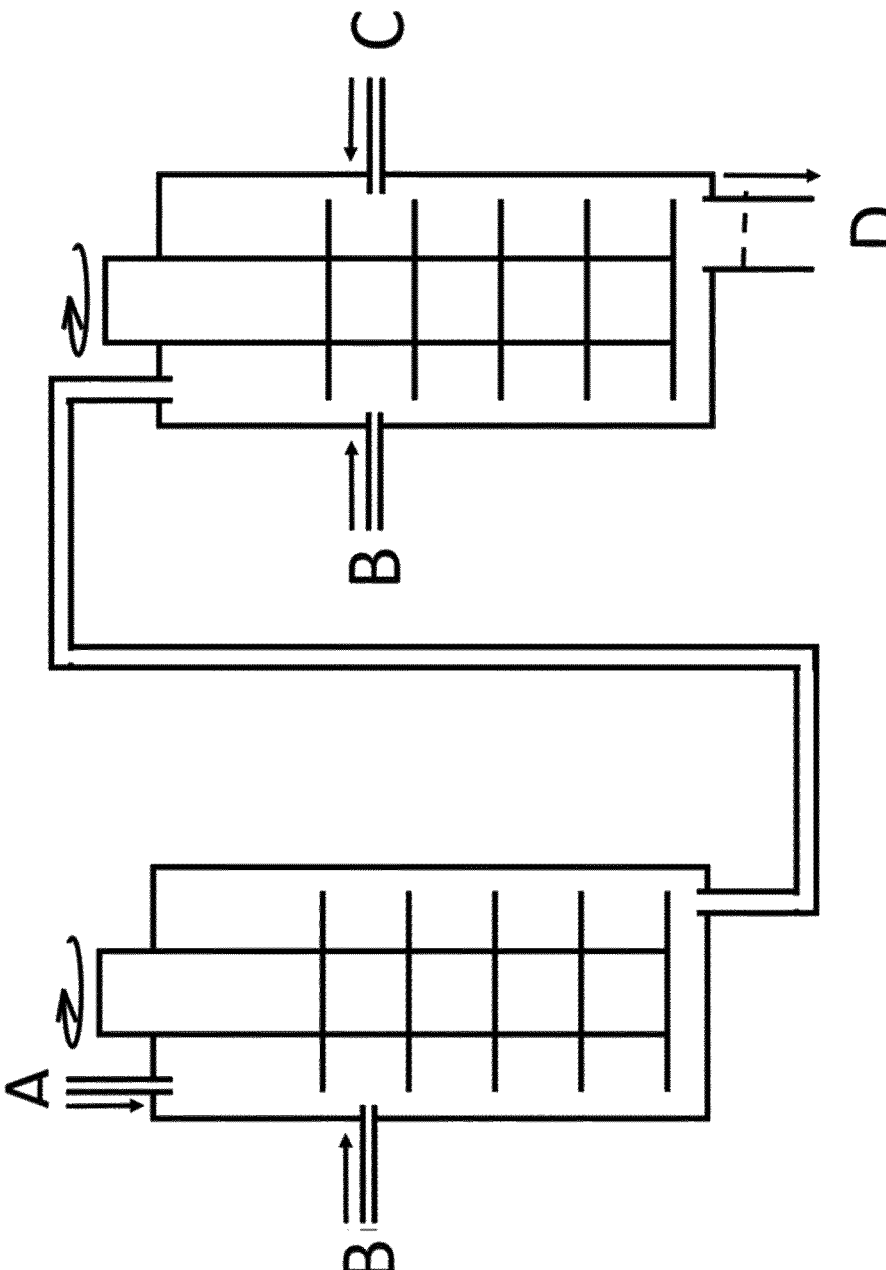
Figure 7: Schematic figure of a the inventive system comprising two dry sandmills and inlets A), B) C) and outlet D) wherein the two dry sandmills are connected via a transporting pipeline

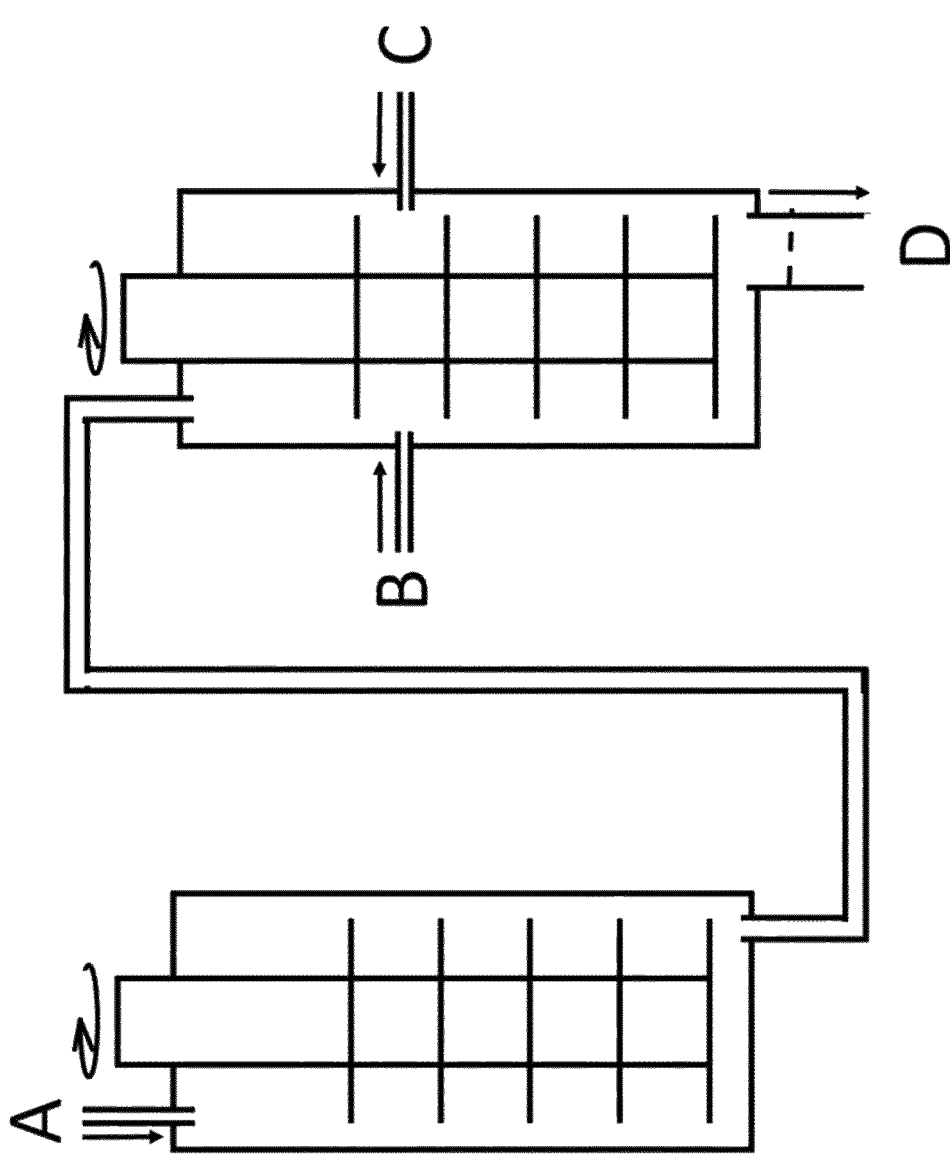
Figure 8: Schematic figure of a the inventive system comprising two dry sandmills and inlets A), B) C) and outlet D) wherein the two dry sandmills are connected via a transporting pipeline

PROCESS FOR PRODUCING NANO PRECIPITATED CALCIUM CARBONATE

The present invention refers to a process for producing nano precipitated calcium carbonate (nano-PCC), as well as to the nano precipitated calcium carbonate (nano-PCC) obtained by such a process and a system for producing the nano precipitated calcium carbonate (nano-PCC) comprising at least one dry mill and preferably a dry sandmill. Furthermore, the present invention refers to the use of the nano precipitated calcium carbonate (nano-PCC) as well as to the use of the inventive system for producing nano precipitated calcium carbonate (nano-PCC).

In the recent years calcium carbonate has found a wide array of uses across many fields. For example, calcium carbonate is one of the most widely used minerals in the paper, plastic, paint and coating industries both as a filler and, due to its white colour, as a coating pigment. In the paper industry calcium carbonate is valued for its high brightness, opacity and gloss and is commonly used as a filler to make bright opaque paper. In addition, calcium carbonate is frequently used as an extender in paints and is also used as a filler in adhesives, sealants and plastics. High grade calcium carbonate has also found uses in formulations of pharmaceuticals.

Calcium carbonate is known to exist as natural occurring minerals as well as synthetically produced products. Ground calcium carbonate (GCC) is a calcium carbonate obtained from natural sources and processed through a wet and/or dry treatment step. Precipitated calcium carbonate (PCC) is a synthesized material obtained from a precipitation reaction. While naturally occurring ground calcium carbonate (GCC) is usually used as a filler in many applications, synthetically manufactured precipitated calcium carbonate (PCC) may be tailor-made, for example with respect to its morphology and particle size, allowing PCC to fulfil additional functions.

Generally, one way to produce calcium carbonate commercially is by calcining crude limestone to obtain quicklime. Water is then added to yield an aqueous suspension of calcium hydroxide ("milk of lime") (this reaction is shown in reaction (1)), and carbon dioxide is reintroduced into this slurry to precipitate the calcium carbonate (this reaction is shown in reaction (2)).

$$CaO + H_2O \rightarrow Ca(OH)_2 + heat \quad (1)$$

$$Ca(OH)_2 + CO_2 \rightarrow CaCO_3 + H_2O + heat \quad (2)$$

The product of this process is known as precipitated calcium carbonate ("PCC"). The resulting aqueous suspension, or slurry, of calcium carbonate may be used as it is or further processed (e.g., dewatered, ground, deagglomerated, etc.) to form a dry product. Depending on the exact reaction conditions the precipitation reaction is capable of producing calcium carbonate with different characteristics.

WO 2013/142473 A1 relates to a process comprising the steps of slaking quick lime to obtain slaked lime, and subjecting the slaked lime, without agitation, without prior cooling in a heat exchanger, and in the absence of any additives, to carbonation with carbon dioxide gas to produce PCC.

U.S. Pat. No. 5,811,070 A discloses a process for producing calcium carbonate particles having an average size of 0.1 to 1.0 μm, the process comprising the steps of introducing carbon dioxide into a milk of lime containing a first reagent to prepare an aqueous suspension containing calcium carbonate particles of 0.4 μm in average size, adding a milk of lime into the aqueous suspension, and continuously reacting a carbonated solution containing a second reagent with the aqueous suspension.

However, as can be seen from reaction step (1), water is added to yield an aqueous suspension of calcium hydroxide also known as "milk of lime" and in reaction step (2) carbon dioxide is introduced into this slurry to precipitate the calcium carbonate. Therefore, huge amounts of water are needed by the above process which is unfavourable due to economic and ecologic reasons. Furthermore, the precipitated calcium carbonate is obtained in form of a slurry or suspension. However, if the precipitated calcium carbonate should be used as filler or pigment in paper, plastic, paint and coating industries or in adhesives or sealants it is often necessary to provide a further processing step of dewatering the suspension or slurry in order to obtain dry precipitated calcium carbonate since water usually has negative effects on such compositions. Such a drying step is associated with additional energy and, therefore, should be avoided due to economic and ecological reasons.

Therefore, there is a continuous need for processes providing precipitated calcium carbonate, and especially for processes that allow the control of certain structural properties like the particle size of the produced precipitated calcium carbonate. Furthermore, there is a continuous need for providing precipitated calcium carbonate with specific or tailor-made characteristics like a defined particle size. There is also a continuous need for processes providing precipitated calcium carbonate, that use only a relatively low amount of water and especially avoid a further drying step.

Accordingly, it is an object of the present invention to provide a process for producing precipitated calcium carbonate with defined particle sizes. In particular, it is an object of the present invention to provide a process for producing nano precipitated calcium carbonate (nano-PCC) which has defined particle sizes in the nanometer range.

Furthermore it is another object of the present invention to provide a process for producing precipitated calcium carbonate that uses only a relatively low amount of water. In particular, it is an object of the present invention to provide precipitated calcium carbonate that has only a relative low residual moisture content.

Furthermore, it is another object of the present invention to provide suitable process equipment to conduct such a process. Especially, it is desirable that the equipment is cheap, easy to handle and adaptable to the respective quantity of precipitated calcium carbonate.

The foregoing and other objects are solved by the subject-matter as defined herein in the independent claims.

According to one embodiment of the present invention a process for producing nano precipitated calcium carbonate (nano-PCC) is provided, comprising the steps of:
- a) providing a calcium oxide containing material,
- b) providing water in an amount of up to 200 wt.-%, based on the total dry weight of the calcium oxide containing material,
- c) providing a carbon dioxide source,
- d) preparing nano-PCC by simultaneously or consecutively carrying out the following steps (i) and (ii):
- (i) simultaneously mixing and milling the calcium oxide containing material of step a) with the water of step b), and
- (ii) adding under simultaneously mixing and milling the carbon dioxide source of step c) in an amount which corresponds to a mole ratio of the calcium oxide in the calcium oxide containing material of step a) to the carbon dioxide in the carbon dioxide source of step c) of 1:1 to 1:3.5, with the proviso that when steps (i) and (ii) are carried out consecutively, in the first step (i) the calcium oxide containing material of step a) is simultaneously mixed and milled with an amount of the water of step b), which corresponds to a mole ratio of the calcium oxide in the calcium oxide containing material of step a) to water of 1:1 to 1:1.5, and in the second step (ii) the remaining amount of water of step b) is added under simultaneously mixing and milling.

According to another embodiment of the present invention, nano precipitated calcium carbonate obtained by the process of the present invention is provided.

According to another embodiment of the present invention, a system for producing a nano precipitated calcium carbonate comprising at least one dry mill is provided, the system comprising:

A) at least one inlet suitable for feeding calcium oxide containing material into at least one dry mill, wherein said inlet is arranged such that it does not come into direct contact with the milling beads within the at least one dry mill during milling;

B) at least one inlet suitable for feeding water into at least one dry mill;

C) at least one inlet suitable for feeding a carbon dioxide source into at least one dry mill, wherein said inlet is arranged such that it is located below the liquid inlet level in the at least one dry mill; and D) at least one outlet for removing the nano precipitated calcium carbonate from at least one dry mill, wherein said outlet comprises a sieve and is arranged such that it is in direct contact with the milling beads within the at least one dry mill during milling and is at least partially located below the liquid inlet level in the at least one dry mill.

According to another embodiment of the present invention, the inventive nano precipitated calcium carbonate is used in paper, paper products, paper coatings, ink, paint, coating, plastics, polymer compositions, adhesives, building products, sealants, foodstuff, agricultural products, cosmetic products or pharmaceutical products, preferably in paper, paper coatings, plastics, paint, adhesives and sealants and most preferably in adhesives and sealants.

According to another embodiment of the present invention, the inventive system is used for producing nano precipitated calcium carbonate according to the present invention.

The inventors surprisingly found that the above inventive process is a cheap and easy to handle process. Furthermore, only low amount of water is used in the inventive process and, therefore, the inventive process is economic and ecologic in view of the water management. Furthermore, the inventors surprisingly found that by the above inventive process it is possible to control the particle size of the precipitated calcium carbonate and provide nano precipitated calcium carbonate (nano-PCC) which has defined particle sizes in the nanometer range. Additionally, the inventors further found that the obtained nano precipitated calcium carbonate has a relative low residual moisture content and, therefore, it is possible to avoid a further drying step before using the obtained nano precipitated calcium carbonate as filler or pigment in paper, plastic, paint and coating industries or in adhesives or sealants. Thus the additional energy that is normally used for a drying step can be saved and, therefore, the inventive process is very economic and ecologic.

Furthermore, the inventors surprisingly found that the above inventive system can be used for the inventive process to produce the inventive nano precipitated calcium carbonate. The system is cheap, easy to handle and adaptable to the respective quantity of precipitated calcium carbonate.

Advantageous embodiments of the present invention are defined in the corresponding sub-claims.

According to one embodiment the process further comprises the step of e) separating the nano precipitated calcium carbonate from the mixture obtained from step d).

According to another embodiment the process does not involve a drying step and preferably the nano precipitated calcium carbonate obtained in step d) has a residual total moisture content of from 0.1 wt.-% to 10 wt.-%, based on the total dry weight of the nano precipitated calcium carbonate, preferably from 0.2 wt.-% to 8 wt.-%, more preferably from 0.2 wt.-% to 5 wt.-%, and most preferably from 0.2 wt.-% to 3 wt.-%.

According to another embodiment of the inventive process, the calcium oxide containing material provided in step a) has i) a minimum calcium oxide content of at least 75 wt.-%, preferably at least 90 wt.-%, and most preferably 95 wt.-%, based on the total weight of the calcium oxide containing material and/or ii) has a weight median particle size $d_{50}$ of between 1.0 and 300 μm, preferably of between 2 and 200 μm, more preferably of between 4 and 100 μm, and most preferably of between 6 and 80 μm.

According to another embodiment of the inventive process, the carbon dioxide source of step c) comprises between 4 and 99.8 vol.-% carbon dioxide, more preferably between 5 and 95 vol.-% carbon dioxide, even more preferably between 6 and 40 vol.-% carbon dioxide, even more preferably between 7 and 30 vol.-% carbon dioxide and most preferably between 8 and 25 vol.-% carbon dioxide, based on the total volume of the carbon dioxide source.

According to another embodiment of the inventive process, steps (i) and (ii) are carried out consecutively and in the first step (i) the calcium oxide containing material of step a) is simultaneously mixed and milled with an amount of the water of step b), which corresponds to a mole ratio of the calcium oxide in the calcium oxide containing material of step a) to water of 1:1.01 to 1:1.40, preferably in a mole ratio of 1:1.02 to 1:1.20 and most preferably in a mole ratio of 1:1.03 to 1:1.08.

According to another embodiment of the inventive process, in step d) the mole ratio of the calcium oxide in the calcium oxide containing material of step a) to the carbon dioxide in the carbon dioxide source of step c) is 1:1 to 1:2, preferably the mole ratio is 1:1.2 to 1:1.8, more preferably the mole ratio is 1:1.3 to 1:1.7 and most preferably 1:1.4 to 1:1.6.

According to another embodiment of the inventive process, in step d) the steps i) and ii) are carried out consecutively and the amount of water added in step ii) is from 1 wt.-% to 140 wt.-%, based on the total dry weight the calcium oxide containing material, preferably from 20 wt.-% to 130 wt.-%, more preferably from 30 wt.-% to 100 wt.-% and most preferably from 40 wt.-% to 80 wt.-%.

According to another embodiment of the inventive process, in step d) the steps i) and ii) are carried out simultaneously and the amount of water added in step ii) is from 1 wt.-% to 180 wt.-%, based on the total dry weight the calcium oxide containing material, preferably from 20 wt.-% to 150 wt.-%, more preferably from 50 wt.-% to 120 wt.-% and most preferably from 70 wt.-% to 90 wt.-%.

According to another embodiment of the inventive process, the nano precipitated calcium carbonate obtained in step d)

i) has a specific surface area from 5.0 to 80.0 $m^2/g$, preferably from 7.0 to 40.0 $m^2/g$, more preferably from 8.0 to 20.0 $m^2/g$, and most preferably from 10.0 to 15.0 $m^2/g$, measured using nitrogen and the BET method according to ISO 9277:2010 and/or ii) is in form of particles having a number-based median particle size $d_{50}$ of below 900 nm, preferably of between 1.0 to 800 nm, more preferably of between 40 and 700 nm, even more preferably of between 70 and 500 nm and most preferably of between 100 and 400 nm and/or iii) is in form of particles having a number-based top cut particle size $d_{98}$ of below 1000 nm, preferably of between 1.0 to 950 nm, more preferably of between 40 to 900 nm, even more preferably of between 70 to 850 nm and most preferably of between 100 to 700 nm and/or iv) has a residual total moisture content of from 0.1 wt.-% to 10 wt.-%, based on the total dry weight of the nano precipitated calcium carbonate, preferably from 0.2 wt.-% to 8 wt.-%, more preferably from 0.2 wt.-% to 5 wt.-%, and most preferably from 0.2 wt.-% to 3 wt.-%.

According to another embodiment the process is performed in at least one dry mill and preferably in at least one dry sandmill.

According to another embodiment the system comprises one dry mill, which has inlets A), B) and C) and outlet D).

According to another embodiment the system comprises at least two serially arranged dry mills, wherein the first dry mill at least has inlet A) and wherein the second dry mill at least has inlets B) and C) and outlet D) and wherein the at least two serially arranged dry mills are connected to each other for transporting the product of the first dry mill to the second dry mill.

According to another embodiment of the inventive system, the first dry mill also has inlet B).

It should be understood that for the purpose of the present invention, the following terms have the following meaning:

"Precipitated calcium carbonate" (PCC) in the meaning of the present invention is a synthesized material, obtained by a reaction of carbon dioxide, calcium oxide and water. Generally PCC is obtained by precipitation following a reaction of carbon dioxide and calcium hydroxide (hydrated lime) in an aqueous environment (milk of lime) or by precipitation of a calcium and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213 A1, EP 2 524 898 A1, EP 2 371 766 A1, or WO 2013/142473 A1.

"Nano precipitated calcium carbonate" (nano-PCC) in the meaning of the present invention refers to precipitated calcium carbonate in the form of particles in the nanometer size range, namely in an unbound state or as an aggregate or as an agglomerate and where for 50% or more of the particles in the number size distribution, one or more external dimensions is/are in the size range 1 nm to 950 nm. Preferably, for 60% or more, more preferably for 80% or more and most preferably for 99% or more, of the particles in the number size distribution, one or more external dimensions is/are in the size range 1 nm to 950 nm.

Throughout the present document, the "particle size" of particulate materials other than precipitated calcium carbonate is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are smaller than this particle size. For the purpose of the present invention the particle size is specified as weight median particle size $d_{50}$ unless indicated otherwise. For determining the weight median particle size $d_{50}$ value or the top cut particle size $d_{98}$ value or the particle size $d_{75}$ value or the particle size $d_{25}$ value of particles in the range of 0.2 to 100 μm a Sedigraph 5120 device from the company Micromeritics, USA, can be used.

Throughout the present document, the "particle size" of precipitated calcium carbonate is described by its distribution of particle sizes $d^N_x$ which is a number-based particle size distribution and refers to the equivalent spherical dimension derived from translational Brownian motion in a liquid. For example, the $d^N_{50}$ is the number-based median particle size, meaning that 50% by number of all particles are smaller than that particle size. For example, the $d^N_{98}$ is the number-based top cut particle size, meaning that 98% by number of all particles are smaller than that particle size. For determining the number-based median particle size $d^N_{50}$ or the number-based top cut particle size $d^N_{98}$ of nanoparticles, a Malvern Zetasizer Nano ZS employing dynamic light scattering and the Stokes-Einstein relation is used.

A "calcium oxide containing material" in the meaning of the present invention can be a mineral or a synthetic material having a content of calcium oxide of at least 50 wt.-%, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure.

Unless specified otherwise, the term "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is from 0.1 wt.-% to 10 wt.-%, preferably from 0.2 wt.-% to 8 wt.-%, more preferably from 0.2 wt.-% to 5 wt.-%, and most preferably from 0.2 wt.-% to 3 wt.-%, based on the total weight of the dried material.

The "total moisture content" of a material refers to the percentage of moisture (i.e. water) which may be desorbed from a sample upon heating to 220° C.

A "specific BET surface area" (SSA) in the meaning of the present invention is defined as the surface area of the precipitated calcium carbonate particles divided by the mass of PCC particles. As used therein the specific surface area is measured by nitrogen adsorption using the BET isotherm (ISO 9277:2010) and is specified in $m^2/g$.

A "dry mill" in the meaning of the present invention is a mixing and milling device comprising a containment suitable for intake of milling beads. Movement of the containment leads to a movement of the milling beads during milling.

A "dry sandmill" in the meaning of the present invention is a mixing and milling device comprising a containment suitable for intake of milling beads and an agitator in the containment, where the agitator is arranged such that a relative movement of the agitator proportional to the containment leads to a movement of the milling beads during milling. Relative movement means that either the agitator rotates and the containment is fixed, or the containment rotates around the axis of the agitator and the agitator is fixed or both the agitator and the containment rotate but with different rotation speed.

An "inlet" in the meaning of the present invention is a supply line from outside to inside of a containment. An "outlet" in the meaning of the present invention is a supply line from inside to outside of a containment. A "liquid inlet level" in the meaning of the present invention is the level of a liquid in a system or containment after the liquid has been introduced into a system or containment. In case also solids are present in the system or containment the "liquid inlet level" is the level of the slurry or suspension or wet powder present in a system or containment after the liquid and the solids have been introduced into a system or containment. If a slurry or suspension or powder is obtained depends on the amount of liquid and solids.

A "suspension" or "slurry" or "wet powder" in the meaning of the present invention comprises undissolved solids and liquid, and optionally further additives, and usually contains large amounts of solids and, thus, is more viscous and can be of higher density than the liquid from which it is formed. A "wet powder" in the meaning of the present invention comprises a larger amount of undissolved solids in the liquid than a "suspension" or "slurry".

Where the term "comprising" is used in the present description and claims, it does not exclude other elements. For the purposes of the present invention, the term "consisting of" is considered to be a preferred embodiment of the term "comprising of". If, hereinafter, a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention a process for producing nano precipitated calcium carbonate (nano-PCC) is provided, the process comprising the steps of:

a) providing a calcium oxide containing material, b) providing water in an amount of up to 200 wt.-%, based on the total dry weight of the calcium oxide containing material, c) providing a carbon dioxide source, d) preparing nano-PCC by simultaneously or consecutively carrying out the following steps (i) and (ii):

(i) simultaneously mixing and milling the calcium oxide containing material of step a) with the water of step b), and (ii) adding under simultaneously mixing and milling the carbon dioxide source of step c) in an amount which corresponds to a mole ratio of the calcium oxide in the calcium oxide containing material of step a) to the carbon dioxide in the carbon dioxide source of step c) of 1:1 to 1:3.5, with the proviso that when steps (i) and (ii) are carried out consecutively, in the first step (i) the calcium oxide containing material of step a) is simultaneously mixed and milled with an amount of the water of step b), which corresponds to a mole ratio of the calcium oxide in the calcium oxide containing material of step a) to water of 1:1 to 1:1.5, and in the second step (ii) the remaining amount of water of step b) is added under simultaneously mixing and milling.

In the following details and preferred embodiments of the inventive product and process will be set out in more details. It is to be understood that these technical details and embodiments also apply to the inventive use of the products as well as to the inventive system and its use.

Process Step a)

In step a) of the process of the present invention, a calcium oxide containing material is provided.

The calcium oxide containing material of step a) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates, natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcination process in order to obtain a calcium oxide containing material.

Calcium carbonate decomposes at about 1000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step a) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 75 wt.-%, preferably at least 90 wt.-%, and most preferably at least 95 wt.-%, based on the total weight of the calcium oxide containing material. The calcium oxide containing material can comprise calcium carbonate particles, for example, calcium carbonate particles in the micrometer range. These calcium carbonate particles can be present in the nano precipitated calcium carbonate.

According to one embodiment, the calcium oxide containing material consists of solely calcium oxide. In that case the calcium oxide containing material may comprise impurities in an amount up to 3 wt.-%, based on the total dry weight of the calcium oxide containing material. Possible impurities may be, for example, calcium carbonate, quartz, clay, mica, kaolin etc.

The calcium oxide containing material can consist of only one type of calcium oxide containing material. Alternatively, the calcium oxide containing material can consist of a mixture of two or more types of calcium oxide containing materials.

The calcium oxide containing material can be used in the inventive process in its original form, i.e. as a raw material, for example, in form of smaller and bigger chunks. For example, the chunks can have a size from 0.1 to 80 mm, and preferably from 5 to 60 mm. Alternatively, the calcium oxide containing material can be ground finer before use. According to one embodiment of the present invention, the calcium oxide containing material is in forms of particles having weight median particle size $d_{50}$ of between 1.0 and 300 μm, preferably of between 2 and 200 μm, more preferably between 4 and 100 μm, and most preferably of between 6 and 80 μm.

Additionally, or alternatively, the calcium oxide containing material is in forms of particles having a top cut particle size $d_{98}$ of between 1.0 and 1000 μm, preferably of between 10 and 800 μm, more preferably between 50 and 700 μm, and most preferably of between 100 and 600 μm.

Additionally or alternatively, the calcium oxide containing material has a residual total moisture content below 10 wt.-%, based on the total dry weight of the calcium oxide containing material, preferably from 0.01 wt.-% to 9 wt.-%, more preferably from 0.05 wt.-% to 7 wt.-%, and most preferably from 0.1 wt.-% to 5 wt.-%.

Process Step b)

In step b) of the process of the present invention, water is provided in an amount of up to 200 wt.-%, based on the total dry weight of the calcium oxide containing material.

According to a preferred embodiment water is provided in an amount from 1 wt.-% to 180 wt.-%, based on the total dry weight the calcium oxide containing material, more preferably from 20 wt.-% to 150 wt.-%, even more preferably from 50 wt.-% to 120 wt.-% and most preferably from 70 wt.-% to 90 wt.-%.

The water may be provided in form of an aqueous solution comprising in addition to the water at least one other solvent that is different to water.

The at least one other solvent that is different to water may be any solvent that is liquid under standard ambient temperature and pressure (SATP), which is defined as 25° C. and 100 kPa (1 bar).

According to one embodiment the at least one solvent other than water is miscible with water. Solvents that are miscible with water are aprotic polar solvent like ketones, e.g. acetone, lactones like γ-butyrolactone, lactames like N-methyl-2-pyrrolidone, nitriles like acetonitrile, nitro compounds like nitromethane, tertiary carboxamides like dimethylformamide, urea derivates like N,N'-dimethylpropyleneurea (DMPU), sulphoxides like dimethylsulphoxide (DMSO), or protic solvents like alcohols, for example, methanol, ethanol, 2-propanol, tert-butanol, tert-amylalkohol, 1-propanol, 2-butanol, 2-methyl-1-propanol, 1-butanol and diacetonealcohol, primary and secondary amines like 2-aminoethanol and N-methylethanolamine, primary and secondary amides like formamide, and mineral acids like sulphuric acid.

According to a preferred embodiment the aqueous solution comprises water and at least one solvent other than water selected from the group consisting of methanol, ethanol, 1-propanol, acetone and dimethylformamide. According to another embodiment of the present invention the aqueous solution comprises water and ethanol and preferably consists of water and ethanol.

The at least one other solvent than water may be provided in an total amount from 0.1 to 50 vol.-%, based on the total volume of the aqueous solution, preferably in an total amount from 1 to 30 vol.-%, more preferably from 2 to 20 vol.-%, and most preferably from 3 to 10 vol.-%.

According to a preferred embodiment of the present invention no other solvent different to water is provided in step b).

According to another embodiment of the present invention the water of step b) comprises further additives selected from the group consisting of water soluble polymers, water-soluble calcium salts, slaking additives, and mixtures thereof.

Water-soluble polymers are polymers that can be dissolved in water. The water-soluble polymers can have an anionic or cationic overall charge, can be zwitterionic or neutral. The water-soluble polymers can be naturally available polymers or synthetic polymers that can be obtained by polymerization, for example, by methods of radical polymerisation in solution, in a direct or reverse emulsion, in suspension or precipitation in solvents, in the presence of catalytic systems and chain transfer agents, or again by methods of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates. The water-soluble polymers may have a molecular weight $M_w$ of below 100 000 g/mol, or below 50 000 g/mol, or below 10 000 g/mol. According to one embodiment the molecular weight $M_w$ of the water-soluble polymer is in the range from 200 to 6 500 g/mol. Water-soluble polymers and methods to produce them are known to the skilled person.

Water-soluble calcium salts can be anhydrous salts or hydrate salts. According to a preferred embodiment the water-soluble calcium salts are selected from the group consisting of calcium nitrate, calcium sulphate, calcium acetate, calcium benzoate, calcium bicarbonate, calcium bromate, calcium bromide, calcium chlorate, calcium chloride, calcium iodite, calcium nitrite, calcium perchlorate, calcium permanganate, hydrates thereof, and mixtures thereof. As used herein, a "hydrate" is an inorganic salt containing water molecules combined in a definite ratio as an integral part of the crystal. Depending on the number of water molecules per formula unit of salt, the hydrate may be designated as monohydrate, dihydrate, trihydrate, tetrahydrate, pentahydrate, hexahydrate, heptahydrate, octahydrate, nonahydrate, decahydrate, hemihydrate, etc.

Slaking additives may be used to further control the size of the PCC particles and their crystal morphology. The slaking additives may be selected from the group consisting of organic acids, organic acid salts, sugar alcohols, monosaccharides, disaccharides, polysaccharides, gluconates, phosphonates, lignosulphonates, and mixtures thereof.

According to one embodiment of the present invention, the slaking additives are selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulphonate, calcium lignosulphonate, and mixtures thereof. According to a preferred embodiment, the slaking additive(s) is/are sodium citrate and/or saccharose also known as sucrose.

According to one embodiment of the present invention, the water of step b) comprises only one further additive. For example, the water comprises one slaking additive, preferably saccharose. Alternatively, the water of step b) comprises a mixture of two or more types of further additives. For example, the water comprises a mixture of a slaking additive and a water-soluble calcium salt, preferably a mixture of saccharose and calcium chloride.

The further additive(s) may be provided in an total amount from 0.01 to 20 wt.-%, based on the total amount of calcium oxide containing material, preferably in an total amount from 0.05 to 10 wt.-%, more preferably from 0.06 to 0.1 wt.-%, and most preferably from 0.07 to 0.5 wt.-%.

The further additive(s) can be provided in form of a solution or as a dry material. According to one embodiment, the further additive(s) is/are provided in form of a solution. According to another embodiment of the present invention, the further additive(s) is/are provided in form of an aqueous solution.

According to a preferred embodiment of the present invention the water does not comprise further additives.

Process Step c)

In step c) of the process of the present invention a carbon dioxide source is provided.

In accordance with the present invention the carbon dioxide ($CO_2$) source may be a gaseous carbon dioxide source, liquid carbon dioxide source or solid carbon dioxide source. For example, it can be produced by reacting an alkali- and/or earth alkali carbonate with acid. Furthermore, the carbon dioxide source can be produced by the combustion of organics, such as ethyl alcohol, wood and the like or by fermentation. According to a preferred embodiment of the present invention the carbon dioxide source is in form of a gas and is captured from the calcinations of the crushed calcium carbonate as described under step a). According to another embodiment of the present invention the carbon dioxide source may be obtained from an external source, for example, a gas bottle comprising carbon dioxide, or from flue gas.

According to a preferred embodiment the carbon dioxide source is in gaseous form. According to another embodiment the carbon dioxide source in form of a gas further comprises at least one gas other than carbon dioxide. The gas other than carbon dioxide may be a gas that is inert to carbonation, which means that said gas does not participate in the carbonation reaction of the carbon dioxide with calcium hydroxide. Furthermore, the gas other than carbon dioxide may be a gas that is gaseous under standard ambient temperature and pressure (SATP), which is defined as 25° C. and 100 kPa (1 bar). For example, the at least one gas other than carbon dioxide may be selected from the group consisting of methane, ethane, propane, butane, nitrogen, oxygen, helium, neon, argon, crypton, xenon, and mixtures thereof. According to one embodiment the at least one gas other than carbon dioxide may be methane, ethane, propane, butane, nitrogen, oxygen, helium, neon, argon, crypton, xenon, or mixtures thereof and may comprise hydrogen sulphide, sulphur dioxide and/or sulphur trioxide in small amounts, preferably below 1 vol.-%, based on the total volume of the gas. According to a preferred embodiment the at least one gas other than carbon dioxide consists only of methane, ethane, propane, butane, nitrogen, oxygen, helium, neon, argon, crypton, xenon, or mixtures thereof.

According to one embodiment of the present invention, the carbon dioxide source is in form of a gas and comprises carbon dioxide and only one gas other than carbon dioxide. For example, it may comprise carbon dioxide and nitrogen or oxygen and preferably carbon dioxide and nitrogen. According to a preferred embodiment of the present invention the carbon dioxide source is in form of a gas and consists of carbon dioxide and nitrogen or oxygen, and preferably consists of carbon dioxide and nitrogen.

Alternatively, the carbon dioxide source is in form of a gas and may comprise carbon dioxide and a mixture of two or more gases other than carbon dioxide. For example, the carbon dioxide source is in form of a gas and may comprise carbon dioxide and a mixture of nitrogen and oxygen. According to a preferred embodiment of the present invention the carbon dioxide source is in form of a gas and consists of carbon dioxide, nitrogen and oxygen.

The carbon dioxide source in form of a gas may also be air or technical air that may be enriched with carbon dioxide. Air is a naturally occurring mixture comprising primarily nitrogen (about 78.08 vol.-%) and oxygen (about 20.95 vol.-%) and, furthermore, argon (0.93 vol.-%), carbon dioxide (0.04 vol.-%) and traces of other gases. Technical air or synthetic air is a mixture of nitrogen and oxygen, preferably consisting of 79.5 vol.-% nitrogen and 20.5 vol.-% oxygen.

The carbon dioxide source in form of a gas may also be flue gas that is exhausted from industrial processes like combustion processes or calcination processes or alike. The carbon dioxide source in form of a gas may also be flue gas that is exhausted from boilers. The flue gas can be enriched with carbon dioxide or the flue gas can be mixed with carbon dioxide.

According to one embodiment of the present invention the carbon dioxide source of step c) comprises between 4 and 99.8 vol.-% carbon dioxide, more preferably between 5 and 95 vol.-% carbon dioxide, even more preferably between 6 and 40 vol.-% carbon dioxide, even more preferably between 7 and 30 vol.-% carbon dioxide, and most preferably between 8 and 25 vol.-% carbon dioxide, based on the total volume of the carbon dioxide source.

According to another embodiment of the present invention the carbon dioxide source consists only of carbon dioxide.

The carbon dioxide source and especially the carbon dioxide source in form of a gas may be prepared before the step d). For example, it may be prepared by mixing the carbon dioxide source and, for example, at least one gas other than carbon dioxide before step d). The carbon dioxide source of step c) may be used directly in step d) or stored before use in a containment, for example, in a tank. Alternatively the carbon dioxide source of step c) may be prepared during the step d).

Alternatively, the carbon dioxide source may be in the liquid form. For example, the carbon dioxide source may be liquid carbon dioxide that is stored under high pressure.

Process Step d)

In step d) of the process of the present invention nano-PCC is prepared by simultaneously or consecutively carrying out the following steps (i) and (ii):

(i) simultaneously mixing and milling the calcium oxide containing material of step a) with the water of step b), and (ii) adding under simultaneously mixing and milling the carbon dioxide source of step c) in an amount which corresponds to a mole ratio of the calcium oxide in the calcium oxide containing material of step a) to the carbon dioxide in the carbon dioxide source of step c) of 1:1 to 1:3.5, with the proviso that when steps (i) and (ii) are carried out consecutively, in the first step (i) the calcium oxide containing material of step a) is simultaneously mixed and milled with an amount of the water of step b), which corresponds to a mole ratio of the calcium oxide in the calcium oxide containing material of step a) to water of 1:1 to 1:1.5, and in the second step (ii) the remaining amount of water of step b) is added under simultaneously mixing and milling.

According to one embodiment step d) is carried out in that steps (i) and (ii) are carried out simultaneously. In that case in step d) of the present invention nano-PCC is prepared by simultaneously carrying out the following steps (i) and (ii):

(i) simultaneously mixing and milling the calcium oxide containing material of step a) with the water of step b), and (ii) adding under simultaneously mixing and milling the carbon dioxide source of step c) in an amount which corresponds to a mole ratio of the calcium oxide in the calcium oxide containing material of step a) to the carbon dioxide in the carbon dioxide source of step c) of 1:1 to 1:3.5

In that case simultaneously mixing and milling the calcium oxide containing material of step a) with the water of step b) and the carbon dioxide source of step c) in an amount which corresponds to a mole ratio of the calcium oxide in the calcium oxide containing material of step a) to the carbon dioxide in the carbon dioxide source of step c) of 1:1 to 1:3.5 is performed. This process is also called "one-step process".

According to a preferred embodiment of the present invention, in step d) the mole ratio of the calcium oxide in the calcium oxide containing material of step a) to the carbon dioxide in the carbon dioxide source of step c) is 1:1 to 1:2, preferably the mole ratio is 1:1.2 to 1:1.8, more preferably the mole ratio is 1:1.3 to 1:1.7 and most preferably 1:1.4 to 1:1.6.

According to another preferred embodiment of the present invention, the steps i) and ii) are carried out simultaneously and the amount of water added in step ii) is from 1 wt.-% to 180 wt.-%, based on the total dry weight the calcium oxide containing material, preferably from 20 wt.-% to 150 wt.-%, more preferably from 50 wt.-% to 120 wt.-% and most preferably from 70 wt.-% to 90 wt.-%.

According to one embodiment of the present invention, in step d) of the present invention nano-PCC is prepared by simultaneously mixing and milling the calcium oxide containing material of step a) with the water of step b), and the carbon dioxide source of step c) in an amount which corresponds to a mole ratio of the calcium oxide in the calcium oxide containing material of step a) to the carbon dioxide in the carbon dioxide source of step c) of 1:1 to 1:3.5, preferably of 1:1 to 1:2, more preferably the mole ratio is 1:1.2 to 1:1.8, even more preferably the mole ratio is 1:1.3 to 1:1.7 and most preferably 1:1.4 to 1:1.6 and the amount of water is up to 200 wt.-%, based on the total dry weight of the calcium oxide containing material, preferably from 1 wt.-% to 180 wt.-%, based on the total dry weight the calcium oxide containing material, more preferably from 20 wt.-% to 150 wt.-%, even more preferably from 50 wt.-% to 120 wt.-% and most preferably from 70 wt.-% to 90 wt.-%.

According to another embodiment step d) is carried out in that steps (i) and (ii) are carried out consecutively. In that case in step d) of the present invention, nano-PCC is prepared by consecutively carrying out the following steps (i) and (ii):

(i) simultaneously mixing and milling the calcium oxide containing material of step a) with the water of step b), which corresponds to a mole ratio of the calcium oxide in the calcium oxide containing material of step a) to water of 1:1 to 1:1.5, and (ii) adding under simultaneously mixing and milling the remaining amount of water of step b) and the gas of step c) in an amount which corresponds to a mole ratio of the calcium oxide in the calcium oxide containing material of step a) to the carbon dioxide in the gas of step c) of 1:1 to 1:3.5.

In that case, first the calcium oxide containing material of step a) is simultaneously mixed and milled with the water of step b) in a mole ratio of the calcium oxide in the calcium oxide containing material of step a) to water of 1:1 to 1:1.5, and afterwards the the remaining amount of water of step b) and the carbon dioxide source of step c) is added under simultaneously mixing and milling in an amount which corresponds to a mole ratio of the calcium oxide in the calcium oxide containing material of step a) to the carbon dioxide in the carbon dioxide source of step c) of 1:1 to 1:3.5. This process is also called "two-step process".

In this "two-step process" calcium hydroxide $Ca(OH)_2$ is obtained as intermediate product from step i). The amount of calcium hydroxide $Ca(OH)_2$ in the mixture obtained in step i) may be from 20 to 100 wt.-% based on the total dry weight of the mixture obtained in step i), preferably from 50 to 99.9 wt.-%, even more preferably from 70 to 99.9 wt.-% and most preferably from 80 to 99.2 wt.-%.

The calcium hydroxide $Ca(OH)_2$ obtained as intermediate product from step i) in the two step process may i) have a specific surface area from 4.0 to 80.0 $m^2/g$, preferably from 5.0 to 40.0 $m^2/g$, more preferably from 6.0 to 30.0 $m^2/g$, and most preferably from 7.0 to 15.0 $m^2/g$, measured using nitrogen and the BET method according to ISO 9277:2010 and/or ii) be in form of particles having a weight median particle size $d_{50}$ of below 300 μm, preferably of between 1.0 to 200 μm, more preferably of between 2 and 100 μm, even more preferably of between 3 and 50 μm and most preferably of between 4 and 20 μm and/or iii) be in form of particles having a top cut particle size $d_{98}$ of below 1000 μm, preferably of between 10.0 to 950 μm, more preferably of between 50 to 900 μm, even more preferably of between 70 to 850 μm and most preferably of between 100 to 800 μm and/or iv) have a residual total moisture content below 5 wt.-%, based on the total dry weight of the calcium hydroxide $Ca(OH)_2$, preferably from 0.01 wt.-% to 3 wt.-%, more preferably from 0.05 wt.-% to 1 wt.-%, and most preferably from 0.1 wt.-% to 0.3 wt.-% and/or v) be in the form of a powder and have room temperature, i.e. a temperature of 20° C.±2° C., or a temperature of 30° C. to 250°, preferably of 50° C. to 200° C. and most preferably of 100 to 180° C.

According to a preferred embodiment of the present invention, in step d) the mole ratio of the calcium oxide in the calcium oxide containing material of step a) to the carbon dioxide in the carbon dioxide source of step c) is 1:1 to 1:2, preferably the mole ratio is 1:1.2 to 1:1.8, more preferably the mole ratio is 1:1.3 to 1:1.7 and most preferably 1:1.4 to 1:1.6.

According to another preferred embodiment of the present invention, steps (i) and (ii) are carried out consecutively and in the second step (ii) the mole ratio of the calcium hydroxide obtained in step i) to the carbon dioxide in the carbon dioxide source of step c) is 1:1 to 1:2, preferably the mole ratio is 1:1.2 to 1:1.8, more preferably the mole ratio is 1:1.3 to 1:1.7 and most preferably 1:1.4 to 1:1.6.

According to another preferred embodiment of the present invention, steps (i) and (ii) are carried out consecutively and in the first step (i) the calcium oxide containing material of step a) is simultaneously mixed and milled with an amount of the water of step b), which corresponds to a mole ratio of the calcium oxide in the calcium oxide containing material of step a) to water of 1:1.01 to 1:1.40, preferably in a mole ratio of 1:1.02 to 1:1.20 and most preferably in a mole ratio of 1:1.03 to 1:1.08.

According to another embodiment of the present invention, the steps i) and ii) are carried out consecutively and the amount of water added in step ii) is from 1 wt.-% to 140 wt.-%, based on the total dry weight the calcium oxide containing material, preferably from 20 wt.-% to 130 wt.-%, more preferably from 30 wt.-% to 100 wt.-% and most preferably from 40 wt.-% to 80 wt.-%. The amount of water may be added in one portion or in several portions, for example in two, three or four portions. According to a preferred embodiment the water is added in one portion. According to another preferred embodiment the water is added in two portions. In that case, the addition of the water portions and of the gas may be in any order. For example, the first portion of water may be added in step ii) as a first step and, afterwards, the carbon dioxide source and the remaining water portion may be added consecutively or simultaneously. The water may be added in equal portions or in different portions. Alternatively, the water is added continuously during process steps i) and ii).

According to another embodiment of the present invention, the steps i) and ii) are carried out consecutively and the amount of water added in step ii) is from 1 wt.-% to 140 wt.-%, based on the total dry weight the calcium hydroxide obtained in step i), preferably from 20 wt.-% to 130 wt.-%, more preferably from 30 wt.-% to 100 wt.-% and most preferably from 40 wt.-% to 80 wt.-%.

According to another embodiment step d) is carried out in that steps (i) and (ii) are carried out consecutively. In that case in step d) of the present invention, nano-PCC is prepared by consecutively carrying out the following steps (i) and (ii):

(i) simultaneously mixing and milling the calcium oxide containing material of step a) with the water of step b), which corresponds to a mole ratio of the calcium oxide in the calcium oxide containing material of step a) to water of 1:1 to 1:1.5, preferably of 1:1.01 to 1:1.40, more preferably in a mole ratio of 1:1.02 to 1:1.20 and most preferably in a mole ratio of 1:1.03 to 1:1.08 and (ii) adding under simultaneously mixing and milling the remaining amount of water of step b), preferably in an amount from 1 wt.-% to 140 wt.-%, based on the total dry weight the calcium oxide containing material, more preferably from 20 wt.-% to 130 wt.-%, even more preferably from 30 wt.-% to 100 wt.-% and most preferably from 40 wt.-% to 80 wt.-%, and the gas of step c) in an amount which corresponds to a mole ratio of the calcium oxide in the calcium oxide containing material of step a) to the carbon dioxide in the carbon dioxide source of step c) of 1:1 to 1:3.5, preferably of 1:1 to 1:2, more preferably the mole ratio is 1:1.2 to 1:1.8, even more preferably the mole ratio is 1:1.3 to 1:1.7 and most preferably 1:1.4 to 1:1.6.

According to one embodiment of the present invention, the temperature of the water, which is used in step d), is adjusted to be in the range from more than 0° C. and less than 100° C. In other words, the water is adjusted to a temperature range, in which the water is in liquid form. Preferably, the temperature of the water, which is employed in step d) is adjusted to be from 1° C. to 70° C., more preferably from 2° C. to 50° C., even more preferably from 10° C. to 40° C., and most preferably from 20° C. to 30° C. It will be apparent to the skilled person that the initial temperature of the water is not necessarily the same one as the temperature of the mixture prepared in step d). If the inventive process is performed as "two-step process" and steps i) and ii) are performed consecutively, the temperature of the water added in the first step and the temperature of the water added in the second step may be different or the same and preferably are the same.

According to one embodiment of the present invention, the temperature of the calcium oxide containing material, which is used in step d), is adjusted to be in the range from more than 10° C. and less than 250° C. Preferably, the temperature of the calcium oxide containing material, which is employed in step d) is adjusted to be from 15° C. to 150° C., more preferably from 18° C. to 100° C., and most preferably from 20° C. to 50° C. It will be apparent to the skilled person that the initial temperature of the calcium oxide containing material is not necessarily the same one as the temperature of the mixture prepared in step d).

The temperature in steps i) and ii) of process step d) may be the same or may be different. According to one embodiment the temperature in steps i) and ii) of process step d) is the same and preferably is at a temperature of 20° C.±2° C., or at an initial temperature of 30° C. to 60°, preferably 35° C. to 45° C. The temperature may raise to a higher temperature, for example to a temperature between 85° C. and 99° C. during step d), preferably to a temperature between 90° C. and 95° C. due to exothermic reactions and grinding forces. Alternatively the temperature in steps i) and ii) of process step d) is different. For example the temperature in step i) may be performed at a temperature between 15 to 250° C., preferably between 50 to 230° C., even more preferably between 100 to 200° C. and most preferably between 150 to 190° C. Step ii) in step d) may be performed at room temperature, i.e. at a temperature of 20° C.±2° C., or at an initial temperature of 30° C. to 60°, preferably 35° C. to 45° C. The temperature may raise to a higher temperature, for example to a temperature between 85° C. and 99° C. during step d), preferably to a temperature between 90° C. and 95° C. due to exothermic reactions and grinding forces.

The process step d) is performed under simultaneous mixing and milling. Suitable process equipment for simultaneous mixing and milling is known to the skilled person and is commercially available.

In general, the mixing and milling can be carried out with any conventional mixing and milling device, also known as grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, a horizontal ball mill, an attrition mill, a pin mill, a hammer mill, a pulveriser, a shredder, a de-clumper, a knife cutter, or other such equipment known to the skilled man.

According to a preferred embodiment of the present invention, the mixing and milling is carried out in at least one dry mill and preferably in at least one dry sandmill. A "dry sandmill" in the meaning of the present invention is a mixing and milling device comprising a containment suitable for intake of milling beads and an agitator in the containment, where the agitator is arranged such that a relative movement of the agitator proportional to the containment leads to a movement of the milling beads during milling. Relative movement means that either the agitator rotates and the containment is fixed, or the containment rotates around the axis of the agitator and the agitator is fixed or both the agitator and the containment rotate but with different rotation speed.

Process step d) can be carried out in form of a batch process, a semi-continuous or a continuous process.

Additional Process Steps

The process of the present invention can comprise additional process steps.

According to one embodiment of the present invention, the process further comprises the step of e) separating the nano precipitated calcium carbonate from the mixture obtained from step d).

Therefore, the process for producing the nano precipitated calcium carbonate (nano-PCC) of the present invention comprises the steps of:

a) providing a calcium oxide containing material, b) providing water in an amount of up to 200 wt.-%, based on the total dry weight of the calcium oxide containing material, c) providing a carbon dioxide source, d) preparing nano-PCC by simultaneously or consecutively carrying out the following steps (i) and (ii):

(i) simultaneously mixing and milling the calcium oxide containing material of step a) with the water of step b), and (ii) adding under simultaneously mixing and milling the carbon dioxide source of step c) in an amount which corresponds to a mole ratio of the calcium oxide in the calcium oxide containing material of step a) to the carbon dioxide in the carbon dioxide source of step c) of 1:1 to 1:3.5, with the proviso that when steps (i) and (ii) are carried out consecutively, in the first step (i) the calcium oxide containing material of step a) is simultaneously mixed and milled with an amount of the water of step b), which corresponds to a mole ratio of the calcium oxide in the calcium oxide containing material of step a) to water of 1:1 to 1:1.5, and in the second step (ii) the remaining amount of water of step b) is added under simultaneously mixing and milling, and e) separating the nano precipitated calcium carbonate from the mixture obtained from step d).

For the purpose of the present invention, the expression "separating" means that the nano-PCC is removed or isolated from the mixture obtained from step d) of the inventive process. The nano precipitated calcium carbonate obtained from step d) may be separated by any conventional means of separation known to the skilled person. According to one embodiment of the present invention, in process step e) the nano-PCC is separated mechanically. Examples for mechanical separation processes are sieving and centrifugation. According to a preferred embodiment the nano-PCC is separated by sieving, preferably by sieving with a sieve having a mesh size of at least 50, preferably of at least 60, even more preferably of at least 70 and most preferably of at least 80.

It is also preferred that the remaining mixture and/or any one of the reactants may be recycled into the process.

The nano-PCC obtained in step d) and/or step e) may be further processed, e.g., may be deagglomerated or subjected to a dry grinding step. Otherwise, it may also be wet ground in form of a suspension, slurry or wet powder. If the nano-PCC is subjected to deagglomeration and/or grinding steps, these steps may be accomplished by procedures known in the art. Grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Alternatively, the grinding agents may be food agents such as glycol compounds, for example, monoethylene glycol.

According to one embodiment of the present invention, the nano-PCC obtained in step d) and/or step e) may be further dried. The drying step may be carried out in a single step such as spray drying, or in at least two steps. Suitable drying methods and equipment therefore are known to the skilled person and are commercially available.

According to a preferred embodiment of the present invention, the process does not involve a drying step and preferably the nano precipitated calcium carbonate obtained in step d) and/or step e) has a residual total moisture content of from 0.1 wt.-% to 10 wt.-%, based on the total dry weight of the nano precipitated calcium carbonate, preferably from 0.2 wt.-% to 8 wt.-%, more preferably from 0.2 wt.-% to 5 wt.-%, and most preferably from 0.2 wt.-% to 3 wt.-%. If the inventive process is performed in the inventive system as described below, the residual moisture content of the obtained nano-PCC is measured at the at least one outlet of the dry mill and in the case that the at least one dry mill is a dry sandmill, the residual moisture content of the obtained nano-PCC is measured at the at least one outlet of the dry sandmill.

The process of the present invention can be carried out in form of a batch process, a semi-continuous or a continuous process. According to a preferred embodiment of the present invention, the inventive process is carried out in form of a continuous process.

The inventors surprisingly found that the above inventive process is a cheap and easy to handle process. Furthermore, only low amount of water is used in the inventive process and, therefore, the inventive process is economic and ecologic in view of the water management. Furthermore, the inventors surprisingly found that by the above inventive process it is possible to control the particle size of the precipitated calcium carbonate and provide nano precipitated calcium carbonate (nano-PCC) which has defined particle sizes in the nanometer range. Additionally, the inventors further found that by the above inventive process it is possible to provide nano precipitated calcium carbonate that has a relative low residual moisture content. Therefore, a further drying step before using the obtained nano precipitated calcium carbonate as filler or pigment in paper, plastic, paint and coating industries or in adhesives or sealants may be avoided which has a positive effect on the energy overall balance. Thus the inventive process is very economic and ecologic.

Products and Their Use

According to one embodiment of the present invention, a nano precipitated calcium carbonate (nano-PCC) is provided, which is obtained by the process comprising the steps of:

a) providing a calcium oxide containing material, b) providing water in an amount of up to 200 wt.-%, based on the total dry weight of the calcium oxide containing material,

c) providing a carbon dioxide source, d) preparing nano-PCC by simultaneously or consecutively carrying out the following steps (i) and (ii):

(i) simultaneously mixing and milling the calcium oxide containing material of step a) with the water of step b), and (ii) adding under simultaneously mixing and milling the carbon dioxide source of step c) in an amount which corresponds to a mole ratio of the calcium oxide in the calcium oxide containing material of step a) to the carbon dioxide in the gas of step c) of 1:1 to 1:3.5, with the proviso that when steps (i) and (ii) are carried out consecutively, in the first step (i) the calcium oxide containing material of step a) is simultaneously mixed and milled with an amount of the water of step b), which corresponds to a mole ratio of the calcium oxide in the calcium oxide containing material of step a) to water of 1:1 to 1:1.5, and in the second step (ii) the remaining amount of water of step b) is added under simultaneously mixing and milling.

Furthermore, the process may comprise the step of e) separating the nano precipitated calcium carbonate from the mixture obtained from step d).

According to a preferred embodiment, the process does not involve a drying step.

According to one embodiment of the present invention, the nano precipitated calcium carbonate obtained in step d) has a specific surface area from 5.0 to 80.0 $m^2/g$, preferably from 7.0 to 40.0 $m^2/g$, more preferably from 8.0 to 20.0 $m^2/g$, and most preferably from 10.0 to 15.0 $m^2/g$, measured using nitrogen and the BET method according to ISO 9277:2010.

Additionally or alternatively, the nano precipitated calcium carbonate obtained in step d)

is in form of particles having a number-based median particle size $d_{50}$ of below 900 nm, preferably of between 1.0 to 800 nm, more preferably of between 40 and 700 nm, even more preferably of between 70 and 500 nm and most preferably of between 100 and 400 nm.

Additionally or alternatively, the nano precipitated calcium carbonate obtained in step d) is in form of particles having a number-based top cut particle size $d_{98}$ of below 1000 nm, preferably of between 1.0 to 950 nm, more preferably of between 40 to 900 nm, even more preferably of between 70 to 850 nm and most preferably of between 100 to 700 nm.

Additionally or alternatively, the nano precipitated calcium carbonate obtained in step d) has a residual total moisture content of from 0.1 wt.-% to 10 wt.-%, based on the total dry weight of the nano precipitated calcium carbonate, preferably from 0.2 wt.-% to 8 wt.-%, more preferably from 0.2 wt.-% to 5 wt.-%, and most preferably from 0.2 wt.-% to 3 wt.-%.

According to one embodiment of the present invention, the nano precipitated calcium carbonate obtained in step d)

i) has a specific surface area from 5.0 to 80.0 $m^2/g$, preferably from 7.0 to 40.0 $m^2/g$, more preferably from 8.0 to 20.0 $m^2/g$, and most preferably from 10.0 to 15.0 $m^2/g$, measured using nitrogen and the BET method according to ISO 9277:2010 and ii) is in form of particles having a number-based median particle size $d_{50}$ of below 900 nm, preferably of between 1.0 to 800 nm, more preferably of between 40 and 700 nm, even more preferably of between 70 and 500 nm and most preferably of between 100 and 400 nm and

iii) is in form of particles having a number-based top cut particle size $d_{98}$ of below 1000 nm, preferably of between 1.0 to 950 nm, more preferably of between 40 to 900 nm, even more preferably of between 70 to 850 nm and most preferably of between 100 to 700 nm and iv) has a residual total moisture content of from 0.1 wt.-% to 10 wt.-%, based on the total dry weight of the nano precipitated calcium carbonate, preferably from 0.2 wt.-% to 8 wt.-%, more preferably from 0.2 wt.-% to 5 wt.-%, and most preferably from 0.2 wt.-% to 3 wt.-%.

Precipitated calcium carbonate exists in three primary crystalline forms: calcite, aragonite and vaterite, and there are many different polymorphs (crystal habits) for each of these crystalline forms. According to one embodiment of the present invention the nano precipitated calcium carbonate obtained by the inventive process is in the form of particles having a crystal form selected from the group consisting of an aragonitic, vateritic, calcitic crystal form and mixtures thereof, and preferably the crystal form of the precipitated calcium carbonate particles is calcitic.

According to one embodiment of the present invention the nano precipitated calcium carbonate obtained by the inventive process is in the form of particles wherein the form of the precipitated calcium carbonate particles is calcitic. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC) and preferably the crystal habits are scalenohedral (S-PCC), rhombohedral (R-PCC), colloidal (C-PCC) or cubic and most preferably are cubic.

According to another embodiment of the present invention the nano precipitated calcium carbonate obtained by the inventive process is in the form of particles wherein the form of the precipitated calcium carbonate particles is aragonitic. Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

According to one embodiment of the present invention the nano precipitated calcium carbonate obtained by the inventive process has an ISO brightness R457 of at least 80%, preferably between 80 and 99%, more preferably between 85 and 98% and most preferably between 90 and 97%, measured according to ISO 2469.

The present invention also refers to nano precipitated calcium carbonate i) having a specific surface area from 5.0 to 80.0 $m^2/g$, preferably from 7.0 to 40.0 $m^2/g$, more preferably from 8.0 to 20.0 $m^2/g$, and most preferably from 10.0 to 15.0 $m^2/g$, measured using nitrogen and the BET method according to ISO 9277:2010 and ii) being in form of particles having a number-based median particle size $d_{50}$ of below 900 nm, preferably of between 1.0 to 800 nm, more preferably of between 40 and 700 nm, even more preferably of between 70 and 500 nm and most preferably of between 100 and 400 nm and iii) being in form of particles having a number-based top cut particle size $d_{98}$ of below 1000 nm, preferably of between 1.0 to 950 nm, more preferably of between 40 to 900 nm, even more preferably of between 70 to 850 nm and most preferably of between 100 to 700 nm and iv) having a residual total moisture content of from 0.1 wt.-% to 10 wt.-%, based on the total dry weight of the nano precipitated calcium carbonate, preferably from 0.2 wt.-% to 8 wt.-%, more preferably from 0.2 wt.-% to 5 wt.-%, and most preferably from 0.2 wt.-% to 3 wt.-%.

The inventors of the present invention surprisingly found that the precipitated calcium carbonate obtained by the process according to the present invention has improved properties. More precisely, the precipitated calcium carbonate has a defined particle size in the nanometer range and, therefore, is very fine. Additionally, the inventors further found that the obtained nano precipitated calcium carbonate has a relative low residual moisture content and, therefore, it is possible to avoid a further drying step before using the obtained nano precipitated calcium carbonate as filler or pigment in paper, plastic, paint and coating industries or in adhesives or sealants. Thus the additional energy that is normally used for a drying step can be saved and, therefore, the inventive process is very economic and ecologic.

System for Producing Nano Precipitated Calcium Carbonate

The process according to the present invention may be performed in any suitable mixing and milling system.

According to one embodiment of the present invention a system for producing a nano precipitated calcium carbonate comprising at least one dry mill is provided, the system comprising:

A) at least one inlet suitable for feeding calcium oxide containing material into at least one dry mill, wherein said inlet is arranged such that it does not come into direct contact with the milling beads within the at least one dry mill during milling;

B) at least one inlet suitable for feeding water into at least one dry mill;

C) at least one inlet suitable for feeding a carbon dioxide source comprising carbon dioxide into at least one dry mill, wherein said inlet is arranged such that it is located below the liquid inlet level in the at least one dry mill; and D) at least one outlet for removing the nano precipitated calcium carbonate from at least one dry mill, wherein said outlet comprises a sieve and is arranged such that it is in direct contact with the milling beads within the at least one dry mill during milling and is at least partially located below the liquid inlet level in the at least one dry mill.

According to a preferred embodiment of the present invention, the at least one dry mill is a dry sandmill.

An "inlet" in the meaning of the present invention is a supply line from the outside to the inside of the at least one dry mill. The "inlets" A), B) and C) are suitable for feeding calcium oxide containing material and/or water and/or carbon dioxide source to the at least one dry mill.

The inlets may be the same or may be different. According to one embodiment, all the inlets are the same. According to another embodiment all the inlets are different.

The inlets can be present separately or combined. According to one embodiment of the present invention all the inlets are present separately and, therefore, at least three inlets are present in the at least one dry mill. According to another embodiment of the present invention, two inlets are present in a combined arrangement and at least one inlet is present separately. For example the inlets for feeding the calcium oxide containing material and the water are present in a combined arrangement and the inlet for feeding the carbon dioxide source comprising the carbon dioxide is present separately. According to another embodiment at least the three inlets are present in a combined arrangement.

The inlets are designed such that they are suitable to feed the respective educts to the at least one dry mill. Such inlets are known to the skilled person and are commercially available.

According to one embodiment of the present invention the inlet is in form of a pipe or tube which is impermeable for liquids and/or gas.

An "outlet" in the meaning of the present invention is a supply line from the inside to the outside of the at least one dry mill. The outlet D) is suitable for removing the nano precipitated calcium carbonate from at least one dry mill. Furthermore, the outlet comprises a sieve.

The outlet may be the same or may be different to the at least one inlet. According to one embodiment, the outlet is the same than the at least one inlet. According to another embodiment the outlet is different to the at least one inlet.

The outlet is designed such that it is suitable for removing the product, namely the nano precipitated calcium carbonate from the at least one dry mill. Such outlets are known to the skilled person and are commercially available.

According to one embodiment of the present invention the outlet is in form of a pipe or tube which is impermeable for liquids.

Furthermore, the outlet comprises a sieve. A "sieve" or "mesh strainer" in the meaning of the present invention is a device for separating wanted elements from unwanted material. More precisely, the sieve in the outlet of the at least one dry mill holds the milling beads back in the at least one dry mill and, therefore, separates the nano precipitated calcium carbonate particles from the milling beads. Suitable sieves are known to the skilled person and are commercially available.

According to one embodiment of the present invention the sieve has a mesh size of at least 50, preferably at least 60, more preferably at least 70, even more preferably at least 80 and most preferably of at least 90.

For preparing the inventive process milling beads have to be incorporated in the inventive system. Milling beads are grinding media, normally in the form of beads or balls which lead to a mixing and/or refinement of the respective material within the system, wherein the milling beads are used. The milling beads can have different sizes and can be produced from different materials. Milling beads are known to the skilled person and are commercially available. The skilled person will select the milling beads for the inventive process dependent on the used educts, the obtained product and the used system.

The dimensions and the design of the system according to the present invention can be adopted to the respective amount of educts and the surrounding.

It is especially preferred that if the inventive process is performed as "one-step process" as described above, the system comprises only one dry mill. In that case it is especially preferred that the one dry mill has inlets A), B) and C) and outlet D). According to another preferred embodiment, the system comprises only one dry sandmill and has inlets A), B) and C) and outlet D). Such an inventive system is schematically shown in FIG. 5.

According to a preferred embodiment of the present invention the inventive system consists of one dry mill, wherein the dry mill comprises A) at least one inlet suitable for feeding calcium oxide containing material into at least one dry mill, wherein said inlet is arranged such that it does not come into direct contact with the milling beads within the at least one dry mill during milling;

B) at least one inlet suitable for feeding water into at least one dry mill;

C) at least one inlet suitable for feeding a carbon dioxide source comprising carbon dioxide into at least one dry mill, wherein said inlet is arranged such that it is located below the liquid inlet level in the at least one dry mill; and D) at least one outlet for removing the nano precipitated calcium carbonate from at least one dry mill, wherein said outlet comprises a sieve and is arranged such that it is in direct contact with the milling beads within the at least one dry mill during milling and is at least partially located below the liquid inlet level in the at least one dry mill.

In an exemplified embodiment, the inventive system consists of one dry mill, wherein the dry mill is in form of a cylinder. According to another exemplified embodiment, the inventive system consists of one dry sandmill, wherein the dry sandmill is in form of a cylinder, comprising an agitator, which is located in the median axis of the cylinder.

According to a preferred embodiment the calculated value (quotient) of the length to diameter ratio of the cylinder is from 1 to 5, preferably from 2 to 4, for example about 3. According to another preferred embodiment the calculated value (quotient) of the diameter ratio of the cylinder to the agitator is from 0.1 to 0.9, preferably from 0.2 to 0.7, more preferably from 0.3 to 0.5, for example 0.4.

It is preferred that the cylinder is arranged vertically. The at least one inlet A) for feeding calcium oxide containing material into the dry mill is preferably located on the topside diameter of the cylinder. The at least one outlet D) for removing the nano precipitated calcium carbonate from the dry mill is preferably located on the downside diameter of the cylinder. The at least one inlet B) for feeding water and the at least on inlet C) for feeding calcium carbonate source comprising carbon dioxide into the dry mill are preferably located on the tread of the cylinder.

According to a preferred embodiment the downside diameter represent the outlet D) and merely consists of the sieve and preferably is in the form of a wedge wire screen of 0.2 to 1.5 mm, preferably of 0.4 to 1.2 mm and most preferably of 0.6 to 1.0 mm.

According to another preferred embodiment, the at least one inlet B) and the at least one inlet C) are located at the same height of the tread of the cylinder. According to another embodiment the at least one inlet B) and the at least one inlet C) are located at different heights of the tread of the cylinder. For example, the inlet C) is below or above the inlet B) and preferably is below the inlet B). According to an exemplified embodiment the at least one inlet B) and the at least one inlet C) are located at the same height of the tread of the cylinder and are arranged opposite to one another.

According to another embodiment the agitator of the present system comprises at least on arm present in the cylinder. The at least one arm is suitable for moving the beads that will be added into the dry sandmill upon relative movement of the agitator to the cylinder.

If the inventive process is performed as "two-step process" as described above, the system comprises at least two dry mills. The at least two dry mills may be the same or may be different. According to a preferred embodiment the at least two dry mills are different. In that case it is especially preferred that the system comprises at least two serially arranged dry mills, wherein the first dry mill at least has inlet A) and wherein the second dry mill at least has inlets B) and C) and outlet D) and wherein the at least two serially arranged dry mills are connected to each other for transporting the product of the first dry mill to the second dry mill. According to another preferred embodiment the at least two dry mills are dry sandmills that are different. In that case it is especially preferred that the system comprises at least two serially arranged dry sandmills, wherein the first dry sandmill at least has inlet A) and wherein the second dry sandmill at least has inlets B) and C) and outlet D) and wherein the at least two serially arranged dry sandmills are connected to each other for transporting the product of the first dry mill to the second dry sandmill. Such an inventive system is schematically shown in FIG. 8. According to a further preferred embodiment the first dry mill, preferably in form of a dry sandmill, also has inlet B). Such an inventive system is schematically shown in FIG. 7.

According to a preferred embodiment of the present invention the inventive system consists of two dry mills that are arranged serially, wherein the two serially arranged dry mills are connected to each other for transporting the product of the first dry mill to the second dry mill, and wherein the first dry mill comprises A) at least one inlet suitable for feeding calcium oxide containing material into at least one dry mill, wherein said inlet is arranged such that it does not come into direct contact with the milling beads within the at least one dry mill during milling;

and wherein the second dry mill comprises

B) at least one inlet suitable for feeding water into at least one dry mill;

C) at least one inlet suitable for feeding a carbon dioxide source comprising carbon dioxide into at least one dry mill, wherein said inlet is arranged such that it is located below the liquid inlet level in the at least one dry mill; and D) at least one outlet for removing the nano precipitated calcium carbonate from at least one dry mill, wherein said outlet comprises a sieve and is arranged such that it is in direct contact with the milling beads within the at least one dry mill during milling and is at least partially located below the liquid inlet level in the at least one dry mill.

According to another preferred embodiment of the present invention the inventive system consists of two dry mills that are arranged serially, wherein the two serially arranged dry mills are connected to each other for transporting the product of the first dry mill to the second dry mill, and wherein the first dry mill comprises A) at least one inlet suitable for feeding calcium oxide containing material into at least one dry mill, wherein said inlet is arranged such that it does not come into direct contact with the milling beads within the at least one dry mill during milling; and B) at least one inlet suitable for feeding water into at least one dry mill;

and wherein the second dry mill comprises

B) at least one inlet suitable for feeding water into at least one dry mill;

C) at least one inlet suitable for feeding a carbon dioxide source comprising carbon dioxide into at least one dry mill, wherein said inlet is arranged such that it is located below the liquid inlet level in the at least one dry mill; and D) at least one outlet for removing the nano precipitated calcium carbonate from at least one dry mill, wherein said outlet comprises a sieve and is arranged such that it is in direct contact with the milling beads within the at least one dry mill during milling and is at least partially located below the liquid inlet level in the at least one dry mill.

According to one embodiment, the inventive system comprises two dry mills, that are arranged serially wherein the dry mills have the form of a cylinder.

In an exemplified embodiment, the inventive system consists of two dry sandmills, that are arranged serially wherein the dry sandmills have the form of a cylinder, comprising an agitator, which is located in the median axis of the cylinder.

In another exemplified embodiment, the inventive system comprises two dry sandmills, that are arranged serially wherein the dry sandmills have the form of a cylinder, comprising an agitator, which is located in the median axis of the cylinder.

According to a preferred embodiment the calculated value (quotient) of the length to diameter ratio of the cylinder is from 1 to 5, preferably from 2 to 4, for example about 3. According to another preferred embodiment the calculated value (quotient) diameter ratio of the cylinder to the agitator is from 0.1 to 0.9, preferably from 0.2 to 0.7, more preferably from 0.3 to 0.5, for example 0.4.

It is preferred that the cylinder is arranged vertically. The at least one inlet A) for feeding calcium oxide containing material into the first dry mill is preferably located on the topside diameter of the cylinder. The at least one outlet D) for removing the nano precipitated calcium carbonate from the second dry mill is preferably located on the downside diameter of the cylinder. The at least one inlet B) for feeding water to the second dry mill and optionally also to the first dry mill and the at least on inlet C) for feeding carbon dioxide source comprising carbon dioxide into the second dry mill are preferably located on the tread of the cylinder.

According to a preferred embodiment the downside diameter of the second dry mill represent the outlet D) and merely consists of the sieve and preferably is in the form of a wedge wire screen of 0.2 to 1.5 mm, preferably of 0.4 to 1.2 mm and most preferably of 0.6 to 1.0 mm.

According to another preferred embodiment, the at least one inlet B) and the at least one inlet C) in the second dry mill are located at the same height of the tread of the cylinder. According to another embodiment the at least one inlet B) and the at least one inlet C) in the second dry mill are located at different heights of the tread of the cylinder. For example, the inlet C) is below or above the inlet B) and preferably is below the inlet B). According to an exemplified embodiment the at least one inlet B) and the at least one inlet C) in the second dry mill are located at the same height of the tread of the cylinder and are arranged opposite to one another.

According to another embodiment the agitators of the first and the second dry sandmill comprise at least on arm present in the cylinder. The at least one arm is suitable for moving the beads that will be added into the first and second dry sandmill upon relative movement of the agitator to the cylinder.

Furthermore, the at least two serially arranged dry mills are connected to each other for transporting the product of the first dry mill to the second dry mill. According to a preferred embodiment the at least two dry mills are connected via a tube or pipeline which is impermeable for liquids and optionally is also impermeable for gas. The tube or pipeline may also comprise a sieve.

Preferably, the outlet of the first dry mill is arranged such that it is in direct contact with the milling beads within the at least one dry mill during milling and is at least partially located below the liquid inlet level in the at least one dry mill. The inlet of the second dry mill is arranged such that it does not come into direct contact with the milling beads within the second dry mill during milling.

For working the process of the present invention milling beads have to be present in the dry mill. The filling level of the milling beads in the at least one dry mill is from 1 to 90 vol.-%, based on the volume of the at least one dry mill, preferably from 20 to 80 vol.-% and most preferably from 40 to 70 vol.-%. The inlets A), B) and C) and the outlet D) are arranged such that inlet A) does not come into direct contact with the milling beads within the at least one dry mill during milling and outlet D) such that it is in direct contact with the milling beads within the at least one dry mill during milling. The inlets B) and C) can be arranged such that they come into contact or have no contact with the milling beads within the at least one dry mill during milling. According to a preferred embodiment of the present invention inlets B) and C) are arranged such that they come into contact with the milling beads within the at least one dry mill during milling. This can be seen from FIG. 6, wherein the inventive system is shown with milling beads present in the at least one dry sandmill. Inlets B) and C) as well as outlet D) come into direct contact with the milling beads wherein inlet A) does not come into direct contact with the milling beads.

For working the process of the present invention the educts, namely the calcium oxide containing material, water, and carbon dioxide source comprising carbon dioxide have to be present in the inventive system. The inlets A), B) and C) and the outlet D) are arranged such that inlet C) is located below the liquid inlet level in the at least one dry mill and outlet D) is at least partially located below the liquid inlet level in the at least one dry mill. The inlets A) and B) can be arranged such that they are located above or below the liquid inlet level in the at least one dry mill. According to a preferred embodiment of the present invention inlets A) and B) are arranged such that they are located above the liquid inlet level in the at least one dry mill. The "liquid inlet level" in the meaning of the present invention is the level of the liquid, or the slurry or suspension or wet powder in the at least on dry mill after the liquid and optionally the solid has been introduced into the dry mill. This can be seen from FIG. 6, wherein the inventive system is shown with milling beads present in the at least one dry sandmill as well as educt up to the liquid inlet level (which is shown in form of a waved line). Inlets B) and C) as well as outlet D) are arranged such that they are below the liquid inlet level while inlet A) is arranged such that it is above the liquid inlet level.

According to another embodiment of the present invention, the inventive system is used for producing the inventive nano precipitated calcium carbonate.

The inventors surprisingly found that the above inventive system can be used for the inventive process to produce the inventive nano precipitated calcium carbonate. The system is cheap, easy to handle and adaptable to the respective quantity of precipitated calcium carbonate. Furthermore, the inventors surprisingly found that if the inventive system is used for the inventive process to produce the inventive nano precipitated calcium carbonate, the obtained precipitated calcium carbonate has a defined particle sizes in the nanometer range and furthermore has a relative low residual moisture content.

The scope and interest of the present invention will be better understood based on the following examples and figure which are intended to illustrate certain embodiments of the present invention and are non-limitative.

FIGURES

Figure 4:
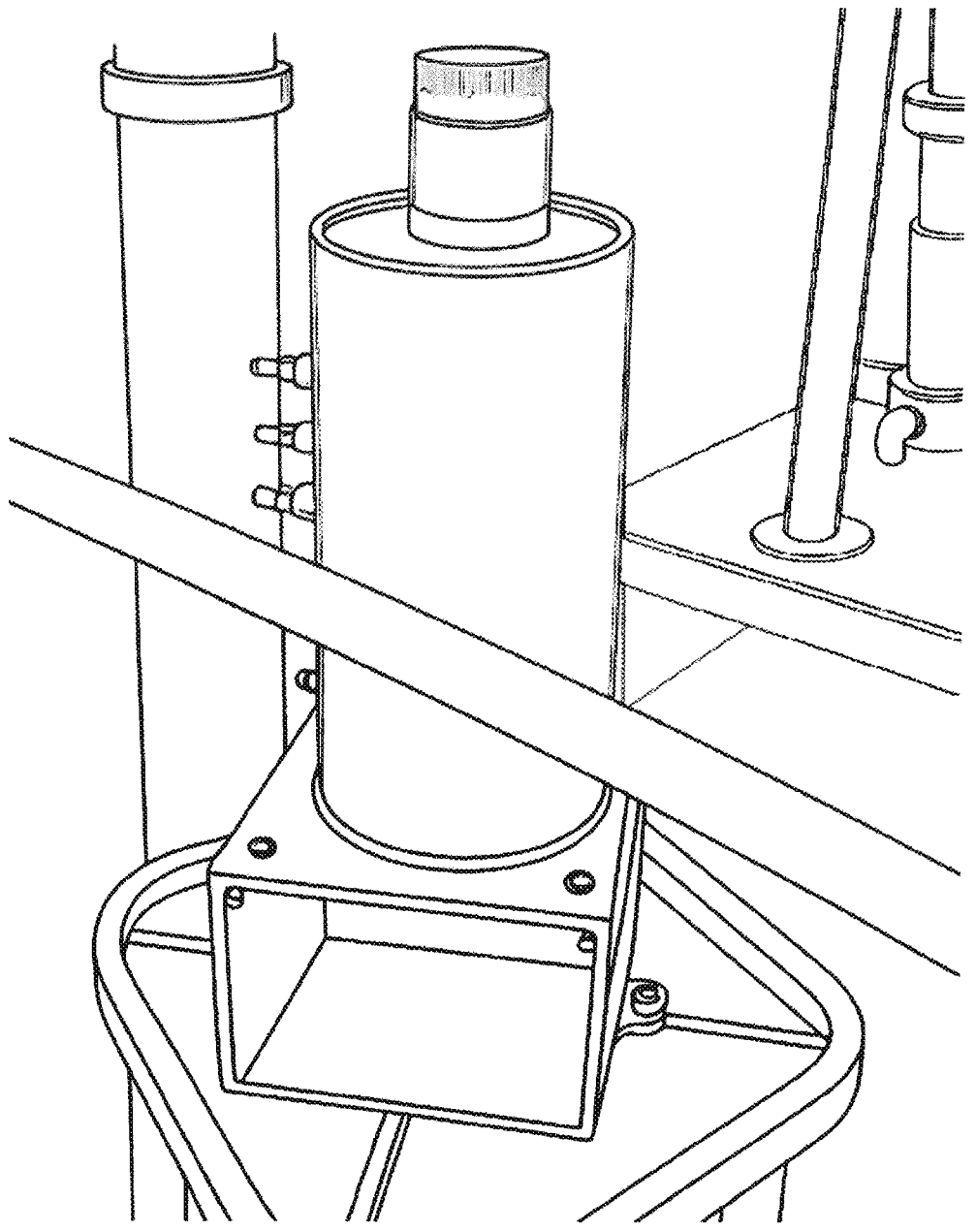

FIG. 1 is a SEM photograph of trial 13, showing nano precipitated calcium carbonate FIG. 2 is a SEM photograph of trial 15, showing nano precipitated calcium carbonate FIG. 3 is a SEM photograph of trial 19, showing nano precipitated calcium carbonate FIG. 4 is a photograph of the inventive system for producing nano-PCC comprising one dry sandmill and inlets A), B) C) and outlet D)

FIG. 5 is a schematic figure of a the inventive system comprising a dry sandmill and inlets A), B) C) and outlet D)

FIG. 6 is a schematic figure of a the inventive system comprising a dry sandmill and inlets A), B) C) and outlet D) wherein milling beads are present in the dry sandmill as well as educts up to the liquid inlet level FIG. 7 is a schematic figure of a the inventive system comprising two dry sandmills and inlets A), B) C) and outlet D) wherein the two dry sandmills are connected via a transporting pipeline FIG. 8 is a schematic figure of a the inventive system comprising two dry sandmills and inlets A), B) C) and outlet D) wherein the two dry sandmills are connected via a transporting pipeline

EXAMPLES

1. Measurement Methods

The following measurement methods are used to evaluate the parameters given in the examples and claims.

Detection of the $Ca(OH)_2$ Content

BET Specific Surface Area of a Material

Throughout the present document, the specific surface area (in $m^2/g$) of the mineral filler is determined using the BET method (using nitrogen as adsorbing gas), which is well known to the skilled man (ISO 9277:2010). The total surface area (in $m^2$) of the mineral filler is then obtained by multiplication of the specific surface area and the mass (in g) of the mineral filler prior to treatment.

Total Moisture Content Measurement

The total moisture content of the nano-PCC is measured according to the Karl Fischer coulometric titration method, desorbing the moisture in an oven at 220° C. and passing it continuously into the KF coulometer (Mettler Toledo coulometric KF Titrator C30, combined with Mettler oven DO 0337) using dry $N_2$ at 100 ml/min for 10 min. A calibration curve using water has to be made and a blind of 10 min gas flow without a sample has to be taken in account.

Particle Size Distribution of Particulate Material Other than Precipitated Calcium Carbonate (PCC)

The particle size distribution of the particles other than PCC was measured using a Sedigraph™ 5120. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Particle Size Distribution of Precipitated Calcium Carbonate (PCC)

The particle size distribution of the prepared PCC particles was measured using a Malvern Zetasizer Nano ZS.

The method and the instrument are known to the skilled person and are commonly used to determine grain size of fillers and pigments. The measurement was carried out in an aqueous solution comprising 0.1 wt.-% $Na_4P_2O_7$ using dynamic light scattering and the Stokes-Einstein relation. The samples were dispersed using a high speed stirrer and supersonics. For the measurement of dispersed samples, no further dispersing agents were added.

Brightness Measurement

The pigment brightness of the obtained particles were measured using an ELREPHO 450x from the company Datacolor according to ISO 2469 and DIN 6167, respectively.

The samples were dried in an oven at 105° C. to a residual moisture content of <0.5% by weight and the resulting powder was treated to deagglomerate the powder particles. From 12 g of said powder a tablet was pressed via application of 4 bar pressure for 15 s. The resulting powder tablet with a diameter of 45 mm was then subjected to the measurement.

Detection of the $Ca(OH)_2$ Content

The $Ca(OH)_2$ content is measured by titration with a standard aqueous hydrochloric acid solution with a concentration of about 0.5 M. (The HCl solution was obtained by dissolving an amount of HCl 37% Analar Normapur obtained from VWR in distilled water). Titration was made by adding 2 grams of the sample, 5 grams of sucrose sugar obtained from RAR and 100 mL of water to a beaker. After mixing for 15 minutes, the sample was titrated with the standard hydrochloric acid solution until a pH of 7.5 was reached. $Ca(OH)_2$ was then calculated from the volume of the acid used.

2. Examples

Used Materials and Equipment

Preparation of the Used Calcium Oxide Containing Material

The calcium oxide containing material is lime obtainable from Lusical under the trade name Cal viva 3-60. The calcium oxide containing material was ground in a Forplex FO pin mill from Poittemill Forplex with a 0.4 mm outlet screen. In some cases, a second grinding of the lime was performed in a ZM200 laboratory mill from Retsch. The obtained product had a $d_{50}$ of 48 μm and a $d_{98}$ of 552 μm after the first grinding step and a $d_{50}$ of 8 μm and a $d_{98}$ of 276 μm after the second grinding step and was used in the following experiments.

The lime with only one grinding step was used in trials 1-7 and the lime with two grinding steps was used in trials 8-10.

The water that has been used in the following examples was distilled water.

The carbon dioxide source that has been used in the following examples was Air Liquide industrial $CO_2$, obtainable from Air Liquide.

The dry mill that has been used in the following examples is a dry sandmill in the form of a cylinder, comprising an agitator which is located in the median axis of the cylinder. The inside volume of the dry sandmill had 2356 $cm^3$. The calculated value of the length to diameter ratio of the cylinder was 3 and the calculated value of the diameter ratio of the cylinder to the agitator was 0.4 The agitator comprised 10 arms and the agitator speed was 260 rpm. Inlet A) was in form of a tube and the calcium oxide containing material has been added manually. Inlet B) was in form of a tube and the water has been inserted by a Selecta Percom N-M II peristaltic pump. Inlet C) was in form of a tube and the carbon dioxide source has been inserted by a flowmeter. The outlet D) is represented by the downside diameter of the cylinder and comprises a wedge wire screen of 0.8 μm. The milling balls in the dry sandmill were Bitossi Alubit Leonardo 1.5-2.5 mm alumina beads, obtained from Industrie Bitossi.

Two-Step Process

Process Step i)

Before process step d) i) has been prepared, the dry sandmill has been started running at 260 rpm until it reached a temperature of about 50° C. The prepared calcium carbonate containing material and water feed were then started at the specified flowrates given in the table below. Calcium carbonate containing material was fed through inlet A) at the top of the mill, while water was fed through inlet B) at a lateral hole in the mill. The obtained calcium hydroxide leaves the mill by the bottom screen (outlet D)) and was collected.

TABLE 1

| | | | | Characteristics of step i) if the inventive process | | | | |
|---|---|---|---|---|---|---|---|---|
| Trial | CaO | Water | | | | Product | | |
| # | g/min | g/min | ° C. | % $Ca(OH)_2$ | % water | $d_{50}$ (μm) | $d_{98}$ (μm) | BET ($m^2$/g) |
| 1-10 | 9.4 | 3.18 | 150 | 84-99 | 0.1-0.3 | 5-16 | 100-800 | 19 |

Process Step ii)

Before process step d) ii) has been prepared, the dry sandmill has been started running at 260 rpm until it reached a temperature of about 50° C. The collected calcium hydroxide was inserted in the second dry sandmill via a transporting pipeline and fed through the top. The water was fed through inlet B) at a lateral hole in the mill and the carbon dioxide source was fed through inlet C) at a lateral hole in the mill. The obtained precipitated calcium carbonate leaves the mill by the bottom screen (outlet D)) and was collected.

TABLE 2

| | | | | | |
|---|---|---|---|---|---|
| | | Characteristics of step ii) if the inventive process | | | |
| Trial | $Ca(OH)_2$ | | $CO_2$ | water | |
| # | g/min | l/min | % excess | g/min | % of feed |
| 11 | 9.43 | 5 | 50 | 3.18 | 34 |
| 12 | 9.43 | 5 | 50 | 6.36# | 67 |
| 13 | 9.43 | 5 | 50 | 6.36 | 67 |
| 14 | 9.43 | 5 | 50 | 3.83 | 41 |
| 15 | 9.43 | 5 | 50 | 3.83* | 41 |
| 16 | 9.43 | 5 | 50 | 4.55* | 48 |

*The calcium hydroxide has been pre-moisturized with 40 wt.-% water before adding $CO_2$.
In example 12, 7.1 mg/min of sugar was added dissolved in the water. This amount relates to an equivalent of 0.1 wt.-% of the $Ca(OH)_2$, expressed as CaO.

TABLE 3

| | | | | | | | |
|---|---|---|---|---|---|---|---|
| | | Characteristics of the produced nano-PCC | | | | | |
| Trial | $Ca(OH)_2$ | Humidity | BET | | Brightness | | |
| # | g/min | % | $m^2$/g | R457 | L | b | y |
| 11 | 24 | 3.0 | | | | | |
| 12 | 9.4 | 2.0 | | | | | |
| 13 | 3.1 | 14.2 | | 90.2 | 96.7 | 1.00 | 2.03 |
| 14 | 24.5 | 0.9 | | | | | |
| 15 | 2.0 | 9.5 | | 92.7 | 97.4 | 0.67 | 1.30 |
| 16 | 6.6 | 2.9 | | | | | |

The inventors showed that by the inventive process it is possible to control the particle size of the precipitated calcium carbonate and provide nano precipitated calcium carbonate (nano-PCC) which has defined particle sizes in the nanometer range. This can, for example be seen from the SEM photographs of trials 13 and 15 (see FIGS. 1 and 2). Furthermore from the above experimental data it can be seen that the obtained nano precipitated calcium carbonate has a relative low residual moisture content. Additionally, it can be seen that only a low amount of water is used in the inventive process.

One Step Process

The prepared calcium carbonate containing material, water and carbon dioxide source were feed to the dry sandmill at the specified flowrates given in the table below. Calcium carbonate containing material was fed through inlet A) at the top of the mill, while water was fed through inlet B) at a lateral hole in the mill and calcium dioxide source was fed through inlet C) at a lateral hole in the mill. The obtained precipitated calcium carbonate leaves the mill by the bottom screen (outlet D)) and was collected.

TABLE 4

| | | | | | |
|---|---|---|---|---|---|
| | | Characteristics of the inventive process | | | |
| Trial | CaO | | $CO_2$ | | water |
| # | g/min | l/min | % excess | g/min | % of feed |
| 17 | 9.43 | 6 | 146 | 3.18 | 34 |
| 18 | 9.43 | 6 | 146 | 6.36 | 67 |
| 19 | 4.40 | 5 | 260 | 5.64 | 128 |
| 20 | 4.04 | 5 | 284 | 2.75 | 68 |
| 21 | 3.30 | 5 | 347 | 2.75 | 83 |

TABLE 5

| | | | | | | | |
|---|---|---|---|---|---|---|---|
| | | Characteristics of produced nano-PCC | | | | | |
| Trial | $Ca(OH)_2$ | Humidity | BET | | Brightness | | |
| # | % | % | $m^2$/g | R457 | L | b | y |
| 17 | 53.7 | 0.4 | | | | | |
| 18 | 42.4 | 0.6 | 13.1 | | | | |
| 19 | 16.6 | 2.7 | | 93.14 | 97.6 | 0.6 | 1.17 |
| 20 | 24.4 | 140.4 | | | | | |
| 21 | 19.8 | 0.3 | | | | | |

The inventors showed that by the inventive process it is possible to control the particle size of the precipitated calcium carbonate and provide nano precipitated calcium carbonate (nano-PCC) which has defined particle sizes in the nanometer range. This can, for example be seen from the SEM photographs of trial 19 (see FIG. 3). Furthermore from the above experimental data it can be seen that the obtained nano precipitated calcium carbonate has a relative low residual moisture content. Additionally, it can be seen that only a low amount of water is used in the inventive process.

Comparative Example

A milk of lime was prepared by mixing under mechanical stirring water with dry sodium citrate (commercially available from Sigma-Aldrich) as slaking additive at an initial temperature between 40 and 41° C. (the amounts of slaking additive are indicated below). Subsequently, calcium oxide (quicklime raw material) was added. The obtained mixture was stirred for 25 min and then sieved through a 200 μm screen.

The obtained milk of lime was transferred into a stainless steel reactor, wherein the milk of lime was cooled down to 50° C. Then the milk of lime was carbonated by introducing an air/$CO_2$ mixture (26 vol-% $CO_2$). During the carbonation step, the reaction mixture was stirred with a speed of 1400 rpm. The kinetic of the reaction was monitored by online pH and conductivity measurements.

The characteristics of the prepared milks of lime and aqueous PCC suspensions are described in the tables below.

TABLE 6

Characteristics of produced milks of lime

| Sample | Sodium citrate amount [wt.-%/wt. CaO] | Solids content [wt.-%] | Brookfield viscosity [mPa · s] |
|---|---|---|---|
| 22 | 0.15 | 13.6 | 32 |

TABLE 7

Characteristics of the obtained aqueous PCC suspensions

| Sample | Carbonation time [min/kg Ca(OH)₂] | Solids content [wt.-%] | $d_{50}$ [μm] | BET [m²/g] | pH | Brookfield viscosity [mPa · s] |
|---|---|---|---|---|---|---|
| 22 | 50 | 18.5 | 1.82 | 4.7 | 7.6 | 34 |

As can be seen from Example 22, slaking additives like sodium acids are necessary when preparing the milk of lime. Furthermore, as can be seen from Example 22 the obtained PCC has no nanometer size range since it has a $d_{50}$ of 1.82 μm. Additionally, only low BET values, for example 4.7 m²/g which is below 5 m²/g can be obtained. Another drawback is that high amounts of water have to be used to prepare the milk of lime and, therefore, the obtained PCC is very wet and has to be dried for further processing.

The invention claimed is:

1. A process for producing nano precipitated calcium carbonate (nano-PCC) comprising the steps of:
   a) providing a calcium oxide containing material,
   b) providing water in an amount of up to 200 wt.-%, based on the total dry weight of the calcium oxide containing material,
   c) providing a carbon dioxide source,
   d) preparing nano-PCC in a crystal form as a particle of calcite by simultaneously carrying out the following steps (i) and (ii):
   (i) simultaneously mixing and milling the calcium oxide containing material of step a) with the water of step b), and (ii) adding under simultaneously mixing and milling the carbon dioxide source of step c) in an amount which corresponds to a mole ratio of the calcium oxide in the calcium oxide containing material of step a) to the carbon dioxide in the carbon dioxide source of step c) of 1:1 to 1:3.5.

2. The process of claim 1, wherein the process further comprises the step of e) separating the nano precipitated calcium carbonate from the mixture obtained from step d).

3. The process of claim 1, wherein process does not involve a drying step and the nano precipitated calcium carbonate obtained in step d) has a residual total moisture content of from 0.1 wt.-% to 10 wt.-%, based on the total dry weight of the nano precipitated calcium carbonate.

4. The process of claim 1, wherein calcium oxide containing material provided in step a) has
   i) a minimum calcium oxide content of at least 75 wt.-% based on the total weight of the calcium oxide containing material and/or
   ii) a weight median particle size $d_{50}$ of between 1.0 and 300 μm.

5. The process of claim 1, wherein carbon dioxide source of step c) comprises between 4 and 99.8 vol.-% carbon dioxide based on the total volume of the carbon dioxide source.

6. The process of claim 1, wherein in step d) the mole ratio of the calcium oxide in the calcium oxide containing material of step a) to the carbon dioxide in the carbon dioxide source of step c) is 1:1 to 1:2.

7. The process of claim 1, wherein d) the amount of water added in step ii) is from 1 wt.-% to 180 wt.-%, based on the total dry weight the calcium oxide containing material.

8. The process of claim 1, wherein precipitated calcium carbonate obtained in step d)
   i) has a specific surface area from 5.0 to 80.0 m²/g measured using nitrogen and the BET method according to ISO 9277:2010 and/or
   ii) is in form of particles having a number-based median particle size $d_{50}$ of below 900 nm and/or
   iii) is in form of particles having a number-based top cut particle size $d_{98}$ of below 1000 nm and/or
   iv) has a residual total moisture content of from 0.1 wt.-% to 10 wt.-%, based on the total dry weight of the nano precipitated calcium carbonate.

9. The process of claim 1, wherein process is performed in at least one dry mill.

10. The process of claim 1, wherein calcium oxide containing material provided in step a) has
   i) a minimum calcium oxide content of at least 95 wt.-% based on the total weight of the calcium oxide containing material and/or
   ii) has a weight median particle size $d_{50}$ of between 6 and 80 μm.

11. The process of claim 1, wherein carbon dioxide source of step c) comprises between 8 and 25 vol.-% carbon dioxide based on the total volume of the carbon dioxide source; and
   that in step d) the mole ratio of the calcium oxide in the calcium oxide containing material of step a) to the carbon dioxide in the carbon dioxide source of step c) is 1:1.4 to 1:1.6; and
   the amount of water added in step ii) is from 70 wt.-% to 90 wt.-%, based on the total dry weight the calcium oxide containing material.

* * * * *